US011304094B2

(12) United States Patent
Ahn et al.

(10) Patent No.: US 11,304,094 B2
(45) Date of Patent: *Apr. 12, 2022

(54) MULTI-USER WIRELESS COMMUNICATION METHOD AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Jinsam Kwak, Gyeonggi-do (KR); Geonjung Ko, Gyeonggi-do (KR); Yongho Kim, Incheon (KR)

(73) Assignees: WILUS INSTITUTE OF STANDARDS AND TECHNOLOGY INC., Gyeonggi-do (KR); SK TELECOM CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/928,838

(22) Filed: Jul. 14, 2020

(65) Prior Publication Data
US 2020/0344646 A1  Oct. 29, 2020

Related U.S. Application Data

(63) Continuation of application No. 16/125,530, filed on Sep. 7, 2018, now Pat. No. 10,750,403, which is a (Continued)

(30) Foreign Application Priority Data

Mar. 10, 2016 (KR) ........................ 10-2016-0029136
Apr. 4, 2016 (KR) ........................ 10-2016-0041302
(Continued)

(51) Int. Cl.
*H04W 28/06* (2009.01)
*H04W 28/14* (2009.01)
(Continued)

(52) U.S. Cl.
CPC ........... *H04W 28/06* (2013.01); *H04W 28/02* (2013.01); *H04W 28/14* (2013.01);
(Continued)

(58) Field of Classification Search
None
See application file for complete search history.

(56) References Cited

U.S. PATENT DOCUMENTS 10,128,925 B2  11/2018  Chun et al.
2006/0048034 A1*  3/2006  Cho ...................... H04L 1/1614
714/749
(Continued)

FOREIGN PATENT DOCUMENTS

CN  1735089  2/2006
JP  2008-509622  3/2008
(Continued)

OTHER PUBLICATIONS

International Search Report for PCT/KR2017/002644 dated Jul. 13, 2017 and its English translation from WIPO (now published as WO 2017/155359).
(Continued)

*Primary Examiner* — Jutai Kao
(74) *Attorney, Agent, or Firm* — Ladas & Parry, LLP

(57) ABSTRACT

Provided is a wireless communication terminal that communicates wirelessly. The terminal includes: a transceiver;
(Continued)

and a processor. The processor is configured to receive a trigger frame for triggering that a frame for setting a link with a wireless communication terminal, which is an AP, is transmitted through UpLink Multi User (UL MU) transmission through the transmission/reception unit. The processor transmits the frame for setting the link through UL MU transmission based on the trigger frame.

16 Claims, 35 Drawing Sheets

Related U.S. Application Data continuation of application No. PCT/KR2017/002644, filed on Mar. 10, 2017.

(30) Foreign Application Priority Data

| Apr. 9, 2016 | (KR) | .................. | 10-2016-0043773 |
| Apr. 12, 2016 | (KR) | .................. | 10-2016-0045142 |

(51) Int. Cl.
| H04W 28/02 | (2009.01) |
| H04W 74/00 | (2009.01) |
| H04W 76/11 | (2018.01) |
| H04W 74/08 | (2009.01) |
| H04W 84/12 | (2009.01) |

(52) U.S. Cl.
CPC .......... *H04W 74/006* (2013.01); *H04W 76/11* (2018.02); *H04W 74/0816* (2013.01); *H04W 84/12* (2013.01)

(56) References Cited

U.S. PATENT DOCUMENTS

| 2006/0259598 | A1* | 11/2006 | Kim ................ H04W 36/005 709/222 |
| 2007/0074090 | A1 | 3/2007 | Trainin |
| 2008/0212612 | A1 | 9/2008 | Singh et al. |
| 2010/0315999 | A1 | 12/2010 | Kakani et al. |
| 2013/0301553 | A1 | 11/2013 | Klein |
| 2014/0241270 | A1 | 8/2014 | Tohzaka et al. |
| 2015/0092687 | A1 | 4/2015 | Yeow et al. |
| 2015/0358067 | A1 | 12/2015 | Zhang et al. |
| 2016/0174240 | A1 | 6/2016 | Li |
| 2016/0182205 | A1 | 6/2016 | Hi et al. |
| 2016/0315675 | A1* | 10/2016 | Seok ................ H04W 74/0816 |
| 2016/0345362 | A1* | 11/2016 | Lee ................ H04W 74/0816 |
| 2017/0127446 | A1* | 5/2017 | Huang ................ H04W 48/16 |
| 2017/0171723 | A1 | 6/2017 | Adachi |
| 2018/0213516 | A1* | 7/2018 | Kim ................ H04W 88/08 |
| 2019/0021025 | A1 | 1/2019 | Ahn et al. |

FOREIGN PATENT DOCUMENTS

| JP | 2015-529047 | 10/2015 |
| JP | 2017/523647 | 8/2017 |
| JP | 2019-513308 | 5/2019 |
| KR | 10-2014-0031150 | 3/2014 |
| KR | 10-2015-0008799 | 1/2015 |
| WO | 2006/016745 | 2/2006 |
| WO | 2011/108832 | 9/2011 |
| WO | 2012/064502 | 5/2012 |
| WO | 2013/129861 | 9/2013 |
| WO | 2016/003037 | 1/2016 |
| WO | 2016/027937 | 2/2016 |
| WO | 2016/028131 | 2/2016 |
| WO | 2016/032007 | 3/2016 |
| WO | 2016/032302 | 3/2016 |
| WO | 2016/105515 | 6/2016 |
| WO | 2017/150042 | 9/2017 |
| WO | 2017/155359 | 9/2017 |

OTHER PUBLICATIONS

Written Opinion of the International Searching Authority for PCT/KR2017/002644 dated Jul. 13, 2017 and its English translation by Google Translate (now published as WO 2017/155359).
Extended European Search Report dated Sep. 27, 2019 for EP Patent Application No. 17779334.6.
Office Action dated Sep. 30, 2019 for Japanese Application No. 2018-552725 and its English translation provided by Applicant's foreign counsel.
Office Action dated Oct. 2, 2019 for U.S. Appl. No. 16/151,304.
Alfred Asterjadhi (Qualcomm INC): "Fragmentation for MU frames—Follow up on acks; Internet URL: https://mentor.ieee.org/802.11/dcn/16/11-16-0050-01-00ax-fragmentation-for-mu-frames-follow-up-on-acks.pptx", IEEE-SA Mentor, Piscataway, NJ USA, doc. IEEE 802.11-16/0050r1, No. 1, Jan. 19, 2016 XP068104806, pp. 1-20.
Laurent Cariou (Intel): "Proposed Spec Text for fragmentation operation; 11-16-1381-00-00ax-proposed-text-changes-for-fragmentation-operation", IEEE-SA Mentor, Psicataway, NJ USA, doc. IEEE 802.11-16/1381r0, Nov. 7, 2016, XP068110761, pp. 1-9; URL:https://mentor.ieee.org/802.11/dcn/16/11-16-1381-00-00ax-proposed-text-changes-for-fragmentation.docx.
Woojin Ahn (Wilus): "Regarding HE fragmentation", IEEE Draft; 11-16-0641-00-00AX-REGARDING-HE-FRAGMENTATION, IEEE-SA Mentor, Piscataway, NJ USA, doc. IEEE 802.11-16/0641r0, May 16, 2016, XP068119496, pp. 1-12, Retrieved from the internet: URL:https://mentor.ieee.org/802.11/dcn/16/11-16-0641-00-00ax-regarding-he-fragmentation.pptx.
Ming Gan et al. (Qualcomm INC): Fragmentation-25.3.3-Part 2, IEEE 802.11-16/0941r0, Apr. 17, 2016, XP055478430, pp. 1-8. URL: https://mentor.ieee.org/11-16-0941-00-00ax-cr-he-fragmentation-part2.
International Preliminary Report on Patentability (Chapter I) dated Sep. 11, 2018 for PCT/KR2017/002644 and its English translation from WIPO.
Office Action dated Jan. 27, 2020 for Japanese Application No. 2018-552725 and its English translation provided by Applicant's foreign counsel.
Final Office Action dated Apr. 10, 2020 for U.S. Appl. No. 16/151,304.
Notice of Allowance dated Apr. 13, 2020 for U.S. Appl. No. 16/125,530 (now published as US 2019/0021025).
Non-Final Office Action dated Dec. 27, 2019 for U.S. Appl. No. 16/125,530 (now published as US 2019/0021025).
International Search Report for PCT/KR2015/008845 dated Dec. 10, 2015, 2 pages.
Office Action of Indian Patent Application No. 201827037360 dated Nov. 29, 2020 from the Indian Patent Office
Summons to attend oral proceedings pursuant to Rule 115(1) EPC dated Jan. 27, 2021 for European Patent Application No. 17 779 334.6.
Office Action dated Mar. 17, 2021 for Korean Patent Application No. 10-2018-7025838 and its English translation provided by the applicant's foreign counsel.
Office Action dated Apr. 9, 2021 for Korean Patent Application No. 10-2018-7028256 and its English translation provided by the applicant's foreign counsel.
Office Action dated Mar. 22, 2021 for Chinese Patent Application No. 201780022278.0 and its English translation provided by the applicant's foreign counsel.
Office Action dated May 3, 2021 for U.S. Appl. No. 16/151,304.
Office Action dated Jul. 22, 2021 for Korean Patent Application No. 10-2018-7025838 and its English translation provided by the applicant's foreign counsel.
Office Action dated Sep. 3, 2021 for U.S. Appl. No. 16/928,754.
Notice of Allowance dated Nov. 8, 2021 for Japanese Patent Application No. 2020-147466 and its English translation provided by Applicant's foreign counsel.

(56) References Cited

OTHER PUBLICATIONS

Notice of Allowance dated Nov. 8, 2021 for Japanese Patent Application No. 2020-147465 and its English translation provided by Applicant's foreign counsel.
Notice of Allowance dated Sep. 30, 2021 for European Patent Application No. 17 779 334.6.
Office Action dated Jan. 26, 2022 for U.S. Appl. No. 16/928,754.

* cited by examiner

MULTI-USER WIRELESS COMMUNICATION METHOD AND WIRELESS COMMUNICATION TERMINAL USING SAME

CROSS-REFERENCE TO RELATED APPLICATIONS

This application is a continuation of U.S. patent application Ser. No. 16/125,530 filed on Sep. 7, 2018, which is a continuation of International Patent Application No. PCT/KR2017/002644 filed on Mar. 10, 2017, which claims the priority to Korean Patent Application No. 10-2016-0029136 filed in the Korean Intellectual Property Office on Mar. 10, 2016, Korean Patent Application No. 10-2016-0041302 filed in the Korean Intellectual Property Office on Apr. 4, 2016, Korean Patent Application No. 10-2016-0043773 filed in the Korean Intellectual Property Office on Apr. 9, 2016, and Korean Patent Application No. 10-2016-0045142 filed in the Korean Intellectual Property Office on Apr. 12, 2016, the entire contents of which are incorporated herein by reference.

TECHNICAL FIELD

The present invention relates to a multi-user wireless communication method and a wireless communication terminal.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An embodiment of the present invention provides a multi-user wireless communication method and a wireless communication terminal using the same.

Technical Solution

According to an embodiment of the present invention, provided is a wireless communication terminal communicating wirelessly, the wireless communication terminal including: a transceiver; and a processor, wherein the processor is configured receive a trigger frame for triggering that a frame for setting a link with a wireless communication terminal, which is an AP, is transmitted through UpLink Multi User (UL MU) transmission through the transceiver, and transmit the frame for setting the link through UL MU transmission based on the trigger frame.

The processor may be configured to determine whether the trigger frame triggers transmission of the frame for setting the link based on an association identifier (AID) indicating a wireless communication terminal triggered by the trigger frame.

The processor may be configured to determine whether the trigger frame triggers transmission of the frame for setting the link based on whether an AID indicating a wireless communication terminal triggered by the trigger frame is a temporary AID, wherein the temporary AID may be a value distinguishable from an AID assigned to the wireless communication terminal after the wireless communication terminal, which is the AP, is associated.

The temporary AID may have a predetermined value.

The processor may be configured to receive a response frame for the frame for setting the link from the wireless communication terminal, which is the AP, through DownLink Multi User (DL MU) transmission through the transmission/reception unit.

The processor may be configured to receive the response frame based on whether a signaling field of a PPDU for the DL MU transmission include a temporary Association Identifier (AID) used to trigger UL transmission of the frame for setting the link, wherein the signaling field of the PPDU may be a field indicating a wireless communication terminal to receive the PPDU, wherein the temporary AID may be a value distinguishable from an AID assigned to the wireless communication terminal after the wireless communication terminal, which is the AP is associated.

The processor may be configured to receive the response frame based on whether a reception address of a frame transmitted through a Resource Unit (RU) corresponding to the temporary AID is an address of the wireless communication terminal.

The AID used by the wireless communication terminal during transmission of the frame for setting the link may be a number outside a range of an AID value assignable to the wireless communication terminal after association.

The trigger frame may trigger transmission of a frame irrelevant to link setting with the frame for setting the link.

The frame for setting the link may be an association request frame.

The frame for setting the link may be an authentication request frame.

According to an embodiment of the present invention, provided is a wireless communication terminal communicating wirelessly, the wireless communication terminal including: a transceiver; and a processor, wherein the processor is configured to transmit a trigger frame for triggering UpLink Multi User (UL MU) transmission of a frame for setting a link with the wireless communication terminal through the transceiver, and receive the frame for setting the link transmitted based on the trigger frame.

The trigger frame may indicate a wireless communication terminal to perform UL transmission based on the trigger frame through an Association Identifier (AID), wherein the processor may be configured to set an AID corresponding to the frame for setting the link to a value distinguishable from an AID assigned to an associated wireless communication terminal after association with the wireless communication terminal.

The processor may be configured to transmit a response frame for the frame for setting the link through DownLink Multi User (DL MU) transmission through the transmission/reception unit.

The processor may be configured to insert a temporary Association Identifier (AID), which is used to trigger UL MU transmission of the frame for setting the link in the trigger frame, into a signaling field of a PPDU for the DL MU transmission, wherein the signaling field of the PPDU may a field indicating a wireless communication terminal to receive the PPDU, wherein the temporary AID may be a value distinguishable from an AID assigned to the wireless communication terminal after the wireless communication terminal, which is the AP, is associated.

The temporary AID may be a number outside a range of an AID value assignable to a wireless communication terminal associated with the wireless communication terminal after association.

The processor may be configured to trigger transmission of a frame irrelevant to link setting with the frame for setting the link through the trigger frame.

The frame for setting the link may be an association request frame.

The frame for setting the link may be an authentication request frame.

According to an embodiment of the present invention, provided is an operation method of a wireless communication terminal communicating wirelessly, the method including: receiving a trigger frame for triggering that a frame for setting a link with a wireless communication terminal, which is an AP, is transmitted through UpLink Multi User (UL MU) transmission, and transmitting the frame for setting the link through UL MU transmission based on the trigger frame.

Advantageous Effects

An embodiment of the present invention provides a multi-user wireless communication method and a wireless communication terminal using the same.

MODE FOR CARRYING OUT THE INVENTION

Figure 1:
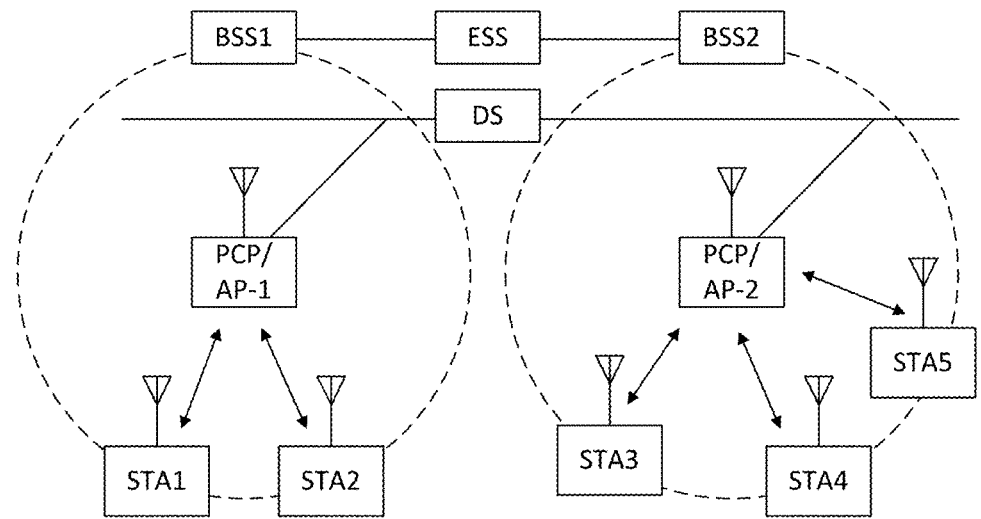
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0029136 (2016 Mar. 10), Nos. 10-2016-0041302 (2016 Apr. 4), Nos. 10-2016-0043773 (2016 Apr. 9), and Nos. 10-2016-0045142 (2016 Apr. 12) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
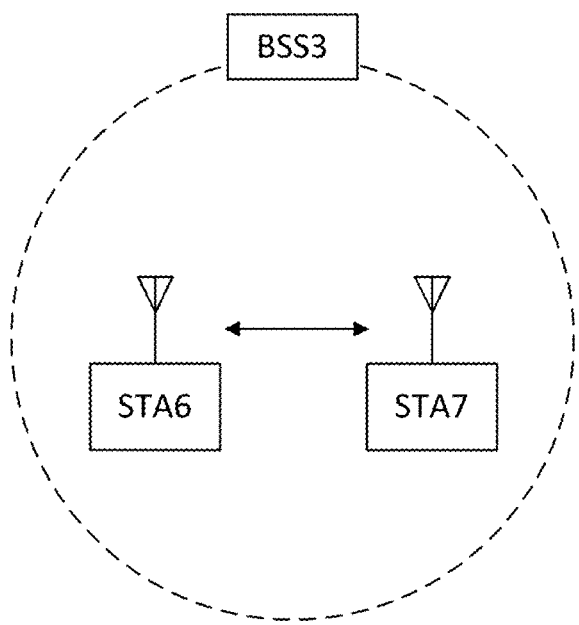
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
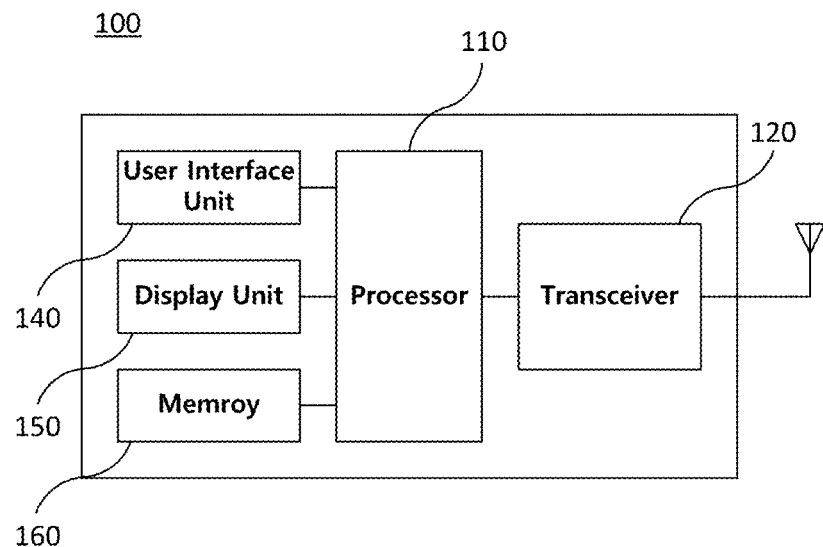
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
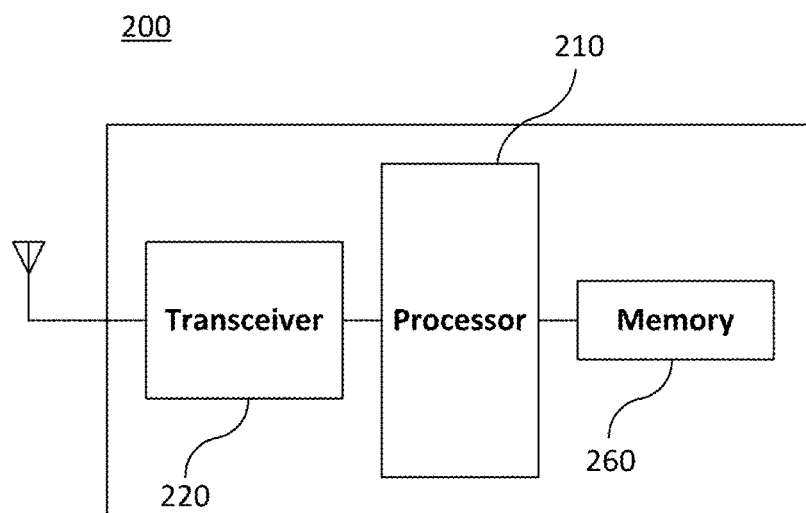
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
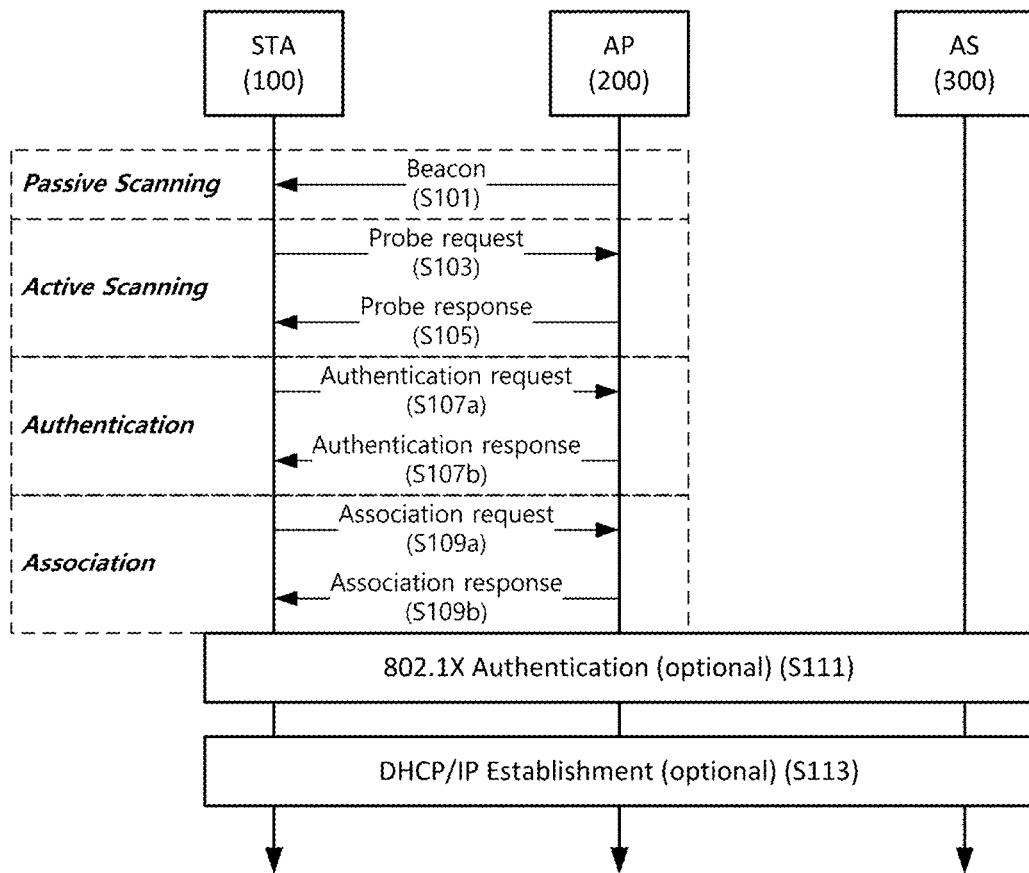
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP.

Figure 6:
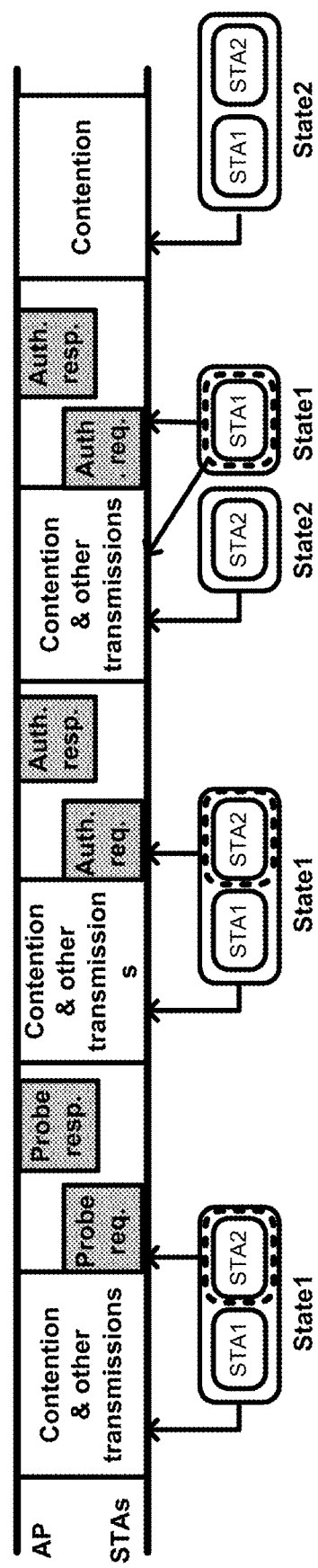
FIG. 6 illustrates an initial link setup process according to an embodiment of the present invention.

FIG. 6 illustrates an initial link setup process according to an embodiment of the present invention.

As described above, the link between the wireless communication terminals is set through a scanning procedure, an authentication procedure, and an association procedure. According to auto scanning or passive scanning, a wireless communication terminal newly accessing the BSS may transmit a probe request frame or proceed with an association process without transmitting a probe request frame. Specifically, when the wireless communication terminal overhears a probe response frame or a beacon frame, the wireless communication terminal may complete the scanning procedure based on the frame. However, in order for the wireless communication terminal to perform the authentication procedure and the association procedure, the wireless communication terminal is required to participate in the contention procedure based on the backoff operation.

For example, in the embodiment of FIG. 6, the first station STA1 and the second station STA2 perform a contention procedure based on the backoff. At this time, the second station STA2 obtains the transmission opportunity through the contention procedure and transmits a probe request frame Probe req. to the access point AP. The access point AP transmits a probe response frame Probe resp. to the second station STA2 in response to the probe request frame Probe req. Again, the first station STA1 and the second station STA2 perform a contention procedure based on the backoff, and the second station STA2 obtains a transmission opportunity. The second station STA2 transmits an authentication request frame Auth. req. to the access point AP. The access point AP transmits an authentication response frame Auth. resp. to the second station STA2 in response to the authentication request frame Auth. req. Again, the first station STA1 and the second station STA2 perform a contention procedure based on the backoff, and the first station STA1 obtains a transmission opportunity. The first station STA1 transmits an authentication request frame Auth. req. to the access point AP based on a previously overheard probe response frame Prob resp. The access point AP transmits an authentication response frame Auth. resp. in response to the authentication request frame Auth. req. Through the repetition of this contention procedure, the first station STA1 and the second station STA2 perform the authentication procedure.

Therefore, when a plurality of wireless communication terminals coexist in a narrow area and a plurality of wireless communication terminals attempt to set up a link at the same time, the performance of the entire network may be degraded. Further, it may take a long time until a wireless communication terminal newly participating in the BSS sets up a link. Therefore, there is a need for a method by which a plurality of wireless communication terminals may efficiently perform initial link setup. This will be described with reference to FIGS. 7 to 15.

Figure 7:
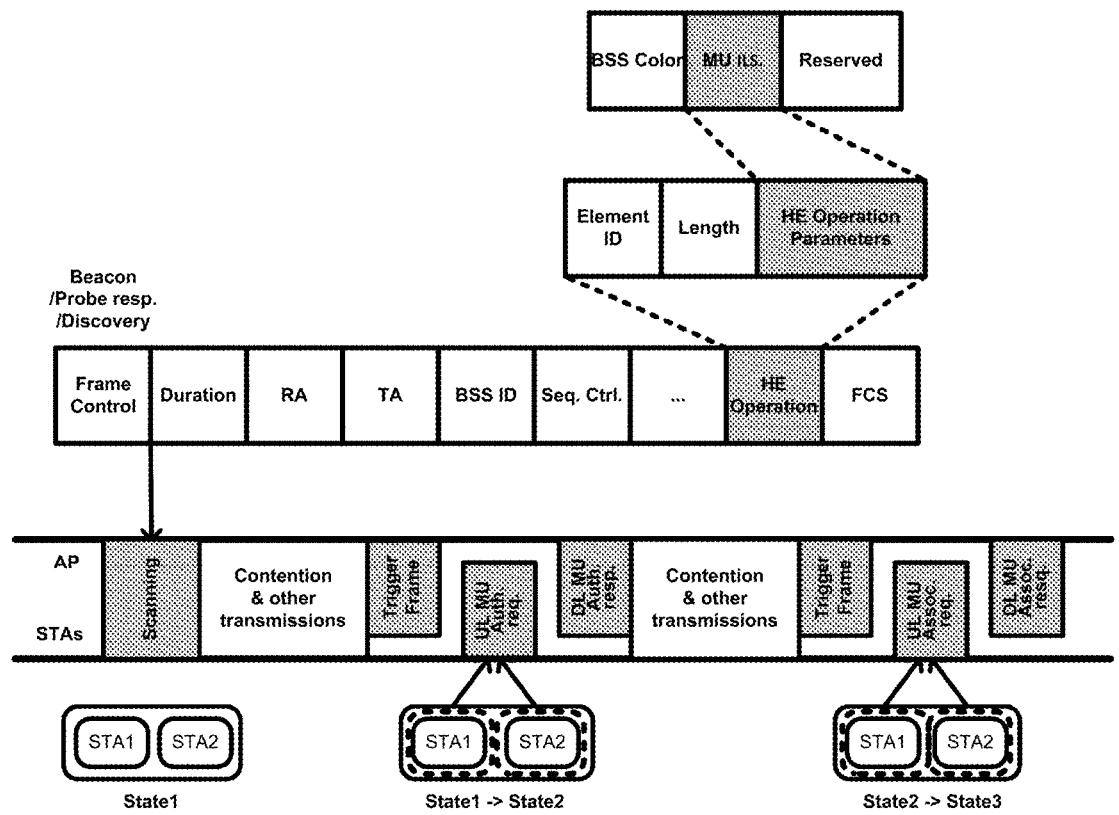
FIG. 7 shows an operation of setting a link by a plurality of wireless communication terminals according to an embodiment of the present invention.

FIG. 7 shows an operation of setting a link by a plurality of wireless communication terminals according to an embodiment of the present invention.

A plurality of wireless communication terminals may set up a link with a wireless communication terminal, which is an AP, through an uplink (UL) Orthogonal Frequency-Division Multiple Access (OFDMA). At this time, the plurality of wireless communication terminals are wireless communication terminals that may not set a link with a wireless communication terminal, which is an AP. Specifically, an unassociated wireless communication terminal may set a link with a wireless communication terminal, which is an AP, through a UL OFDMA. In addition, an unauthenticated wireless communication terminal may set a link with a wireless communication terminal, which is an AP, through UL OFDMA. Specifically, a wireless communication terminal, which is an AP, may transmit a trigger frame for triggering a plurality of wireless communication terminals to transmit frames for setting a link. The frame for setting the link may be an authentication request frame. In addition, a frame for setting a link may be an association request frame. At this time, the plurality of wireless communication terminals may transmit at least one of the authentication request frame and the association request frame to the UL 01-DMA based on the trigger frame. For convenience of description, this link setup procedure is referred to as a multi-user (MU) link setup procedure. According to a specific embodiment, the multiple link setup procedure may refer to only one of the authentication procedure and the association procedure.

The wireless communication terminal, which is an AP, may signal through the management frame that the MU link setting procedure is scheduled. Specifically, the wireless communication terminal, which is an AP, may signal that the MU link setting procedure is scheduled through at least one of a beacon frame, a probe response frame, and a discovery frame. At this time, the wireless communication terminal, which is an AP, may transmit information indicating that the MU link setting procedure is scheduled through the HE operation element for signaling the information on the BSS operation. In addition, the information indicating that the MU link setting procedure is scheduled may include the number of times that the MU link setup procedure is triggered. For example, the information indicating that the MU link setup procedure is scheduled may indicate the number of times that the MU link setup procedure is triggered in binary form.

The non-AP wireless communication terminal may obtain information indicating that the MU link settup procedure is scheduled based on the management frame to determine that the MU link setup procedure is scheduled. At this time, the management frame may be at least one of a beacon frame, a probe response frame, and a discovery frame as described above. In addition, the non-AP wireless communication terminal obtains the HE operation element from the management frame, and obtains information indicating that the MU link setup procedure is scheduled based on the HE operation element. In addition, the non-AP wireless communication terminal may obtain the number of times that the MU link setup procedure is scheduled from the information indicating that the MU link setup procedure is scheduled. At this time, the number of times that the MU link setup procedure is scheduled may indicate the number of scheduled times within a specified period. Specifically, the specified period may be the transmission period of the beacon. In addition, the non-AP wireless communication terminal may determine participation in the multiple link setup procedure based on the buffer status of the wireless communication terminal. In addition, when a non-AP wireless communication terminal participates in the multiple link setup procedure, the wireless communication terminal may not participate in the contention procedure based on the backoff until receiving the trigger frame from the AP.

In the embodiment of FIG. 7, the first station STA1 and the second station STA2 receive a trigger frame after the scanning procedure. The first station STA1 and the second station STA2 simultaneously transmit an authentication request frame UL MU Auth. req. to an access point AP through UL MU transmission using OFDMA on the basis of the trigger frame. Also, the first station STA1 and the second station STA2 simultaneously receive an authentication response frame DL MU Auth. resp. from an access point AP through DL MU transmission using OFDMA. The first station STA1 and the second station STA2 receive the trigger frame again. The first station STA1 and the second station STA2 simultaneously transmit an association request frame UL MU Assoc. req. to an access point AP through UL MU transmission using OFDMA on the basis of the trigger frame. Also, the first station STA1 and the second station STA2 simultaneously receive an association response frame DL MU Assoc. resp. from an access point AP through DL MU transmission using OFDMA. In FIG. 7, a first state State 1 indicates a state in which the scanning procedure is completed, a second state State 2 indicates a state in which the authentication procedure is completed, and a third state State 2 indicates a state in which the association procedure is completed. Through this operation, a plurality of wireless communication terminals may increase the efficiency of the authentication procedure and the association procedure. A specific transmission method and reception method will be described with reference to FIG. 8.

Figure 8:
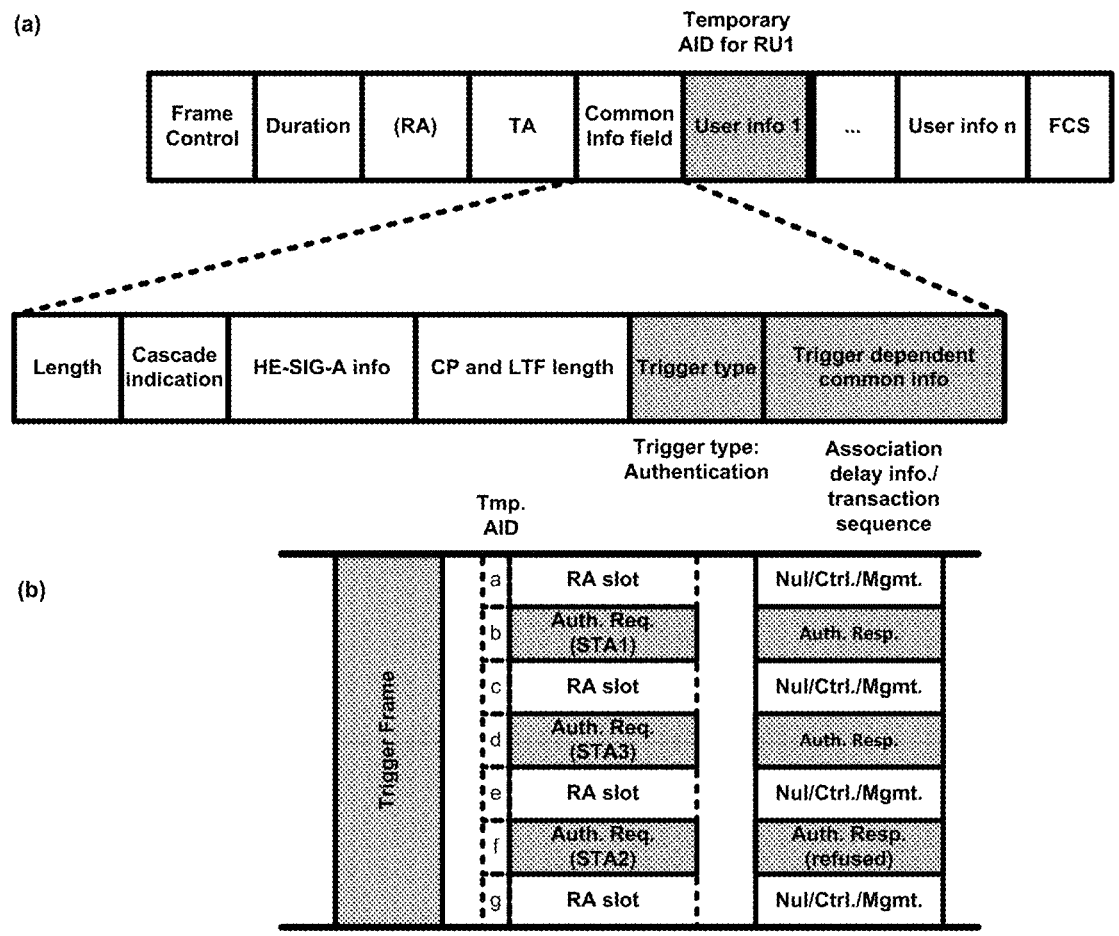
FIG. 8 shows a MU authentication procedure of a wireless communication terminal according to an embodiment of the present invention.

FIG. 8 shows a MU authentication procedure of a wireless communication terminal according to an embodiment of the present invention.

In the above-described MU link setup procedure, the wireless communication terminal, which is an AP, may trigger random access of the wireless communication terminal through the trigger frame. It is difficult for the wireless communication terminal, which is an AP, to know the number or existence of the wireless communication terminals to participate in the link setup. Further, the wireless communication terminal, which is an AP, may indicate through the trigger type of the trigger frame used in the MU link setup procedure to trigger the transmission required for the MU link setup procedure. The non-AP wireless communication terminal may determine whether the trigger frame triggers the transmission for the MU link setup procedure based on the trigger type. Specifically, when the trigger frame triggers transmission of the authentication request frame, the wireless communication terminal, which is an AP, may set the trigger type as authentication.

Also, the wireless communication terminal, which is an AP, may set an association identifier (AID) to be temporarily used by a non-AP wireless communication terminal. This is because the wireless communication terminal, which is an AP, may not know the address of a non-AP wireless communication terminal whose link is not set with the AP and it is before the AID is assigned to the wireless communication terminal whose link with the AP is not set. Specifically, a wireless communication terminal, which is an AP, may assign an AID to be temporarily used by a wireless communication terminal whose link with an AP is not set for each resource unit (RU). For convenience of explanation, the AID to be temporarily used by the wireless communication terminal participating in the link setup procedure is referred to as a temporary AID. In the specific embodiment, the wireless communication terminal, which is an AP, may insert the temporary AID into the Per User Info field corresponding to the RU used for link setup in the trigger frame.

At this time, the temporary AID may have a value different from the AID to be assigned to the wireless communication terminal after association. Specifically, the value of the temporary AID may correspond to any number out of the range of the AID value that may be assigned to the wireless communication terminal after the association. In a specific embodiment, the value of the temporary AID may be one of the reserved values of the AID assigned to the wireless communication terminal after association. For example, the temporary AID may be any number after 2007. The non-AP wireless communication terminal may determine whether the RU is used for the link setup procedure based on the AID value corresponding to the RU in the Per User Info field of the trigger frame. The value of the temporary AID may be distinguished from the AID value assigned to the wireless communication terminal. When the AID value indicating the wireless communication terminal triggered by the trigger frame is a value different from the AID to be assigned to the wireless communication terminal after association, the wireless communication terminal receiving the trigger frame may determine that the corresponding RU is an RU that may be used for link setup. Specifically, when the AID value indicating the wireless communication terminal triggered by the trigger frame is a value different from the AID to be assigned to the wireless communication terminal after association, the wireless communication terminal receiving the trigger frame may determine that the corresponding RU is an RU that may perform random access for link setup. In this case, the value distinguished from the AID to be assigned to the wireless communication terminal after the association of the AID value may correspond to any one out of the range of the AID value that may be assigned to the wireless communication terminal after association as described above.

Also, the wireless communication terminal, which is an AP, may insert association delay information indicating the minimum delay time until the association procedure starts after the authentication procedure in the trigger frame. Specifically, when the connection procedure does not start immediately after the authentication procedure, the wireless communication terminal, which is an AP, may insert association delay information indicating the minimum delay time until the association procedure starts after the authentication procedure. Also, the wireless communication terminal, which is an AP, may insert the association delay information into the Common Info field of the trigger frame. The non-AP wireless communication terminal may obtain the association delay information from the trigger frame and determine whether to participate in the association procedure based on the trigger frame on the basis of the association delay information. Specifically, the non-AP wireless communication terminal may determine whether to transmit the association request frame based on the trigger frame that triggers the transmission of the association request frame based on the association delay information. In a specific embodiment, if the delay time indicated by the association delay information is smaller than a predetermined reference value, the wireless communication terminal may transmit the association request frame to the AP based on the trigger frame to be transmitted after the trigger frame including the association delay information.

In addition, as described above, in the link setup procedure, the wireless communication terminal, which is an AP, may trigger a random access of the wireless communication terminal through the trigger frame. When a wireless communication terminal, which is an AP, triggers a random access, a wireless communication terminal that receives a trigger frame may access an RU assigned to a random access based on a random number within a certain range. At this time, a random number is referred to as an OFDMA backoff (OBO) counter. Specifically, the wireless communication terminal receiving the trigger frame for triggering the random access may reduce the OBO counter by the number of RUs allocated to the random access. The wireless communication terminal receiving the trigger frame may access any one of the RUs assigned to the random access when the OBO counter becomes zero. The non-AP wireless communication terminal may acquire the OBO counter based on the number of times that the trigger frame that triggers the link setup is scheduled. Specifically, the wireless communication terminal may increase the range of the OBO counter based on the number of times that the trigger frame that triggers the link setup is scheduled. For example, a non-AP wireless communication terminal may adjust the maximum value of the OBO counter by multiplying the maximum value of the OBO counter by the number of scheduled trigger frames that trigger the link setup. In another specific embodiment, the non-AP wireless communication terminal may adjust the maximum value of the OBO counter by adding a predetermined constant number to the maximum value of the OBO counter according to the number of times that the trigger frame that triggers the link setup is scheduled. The non-AP wireless communication terminal may obtain a random number within the maximum value of the adjusted OBO counter as the OBO counter.

The wireless communication terminal, which is an AP, may receive a transmitted frame for a link setup based on the trigger frame, and may transmit a response frame for the frame for a link setup. Specifically, a wireless communication terminal, which is an AP, may transmit a response frame for the frame for a link setup through DL MU transmission using OFDMA. At this time, the wireless communication terminal, which is an AP, may use the temporary AID used when the non-AP wireless communication terminal transmits the frame for a link setup, as signaling information for DL MU transmission. Specifically, a wireless communication terminal, which is an AP, may insert a temporary AID used when a non-AP wireless communication terminal transmits a frame for a link setup to a signaling field of a PPDU for DL MU transmission. Specifically, a wireless communication terminal, which is an AP, may use a temporary AID used when a non-AP wireless communication terminal transmits the frame for a link setup, as an AID indicating a wireless communication terminal receiving a DL MU PPDU in the signaling field of the DL MU PPDU. In a specific embodiment, a wireless communication terminal, which is an AP, may use a temporary AID used when a non-AP wireless communication terminal transmits the frame for a link setup to indicate the RU through which the response frame for the frame for a link setup in the signaling field of the DL MU PPDU is transmitted. Also, the signaling field of the DL MU PPDU may be the HE-SIG-B field.

The non-AP wireless communication terminal may receive a response frame for the frame for a link setup based on whether the signaling field of the PPDU for DL MU transmission includes the temporary AID used by the non-AP wireless communication terminal. At this time, the signaling field of the PPDU may be a field indicating a wireless communication terminal to receive the PPDU. Specifically, the non-AP wireless communication terminal may receive a response frame for the frame for a link setup based on whether the signaling field of the PPDU for DL MU transmission contains the temporary AID used by the non-AP wireless communication terminal and the MAC address of the response frame for the frame for a link setup to be transmitted to the RU corresponding to the temporary AID. In a specific embodiment, when the signaling field of the PPDU for DL MU transmission does not include the temporary AID used by the non-AP wireless communication terminal, the non-AP wireless communication terminal may determine that transmission of the frame for a link setup fails. In addition, when the reception address of the MAC frame transmitted through the RU corresponding to the temporary AID is not the non-AP wireless communication terminal, the non-AP wireless communication terminal may determine that the transmission of the frame for a link setup fails. When the non-AP wireless communication terminal determines that the transmission of the frame for a link setup fails, the non-AP wireless communication terminal may discard the assigned temporary AID and retry transmission of the frame for a link setup.

In addition, when a wireless communication terminal, which is an AP, does not receive the frame for a link setup from any one of a plurality of RUs allocated for link setup, the wireless communication terminal, which is an AP, may transmit Null data through a corresponding RU when transmitting a DL MU including a response frame to the frame for a link setup. In addition, when a wireless communication terminal transmits a DL MU PPDU including a response frame to the frame for a link setup, the wireless communication terminal may transmit a frame irrelevant to the link setup through the corresponding DL MU PPDU. Specifically, when a wireless communication terminal, which is an AP, fails to receive the frame for a link setup from any one of a plurality of RUs allocated for link setup, the wireless communication terminal, which is an AP, may transmit a frame irrelevant to the link setup to a wireless communication terminal with previously set link through a corresponding RU when transmitting a DL MU that contains a response to the frame for a link setup. At this time, a frame irrelevant to the link setup may be a data frame. In addition, a frame irrelevant to the link setup may be a control frame.

The response frame to the frame for a link setup transmitted through the DL MU PPDU may be an authentication response frame. In addition, the response frame to the frame for setting a link transmitted through the DL MU PPDU may be an association response frame.

When 4-way handshake authentication is used, the wireless communication terminal, which is an AP, may transmit a trigger frame for an authentication procedure after receiving an authentication request frame. At this time, the wireless communication terminal, which is an AP, may insert authentication sequence information indicating the progress of the authentication procedure in the trigger frame. Specifically, the wireless communication terminal, which is an AP, may insert the authentication sequence information into the trigger-dependent common info of the trigger frame. At this time, the non-AP wireless communication terminal may use the allocated temporary AID until the AID is allocated through association with the AP.

The specific format of the trigger frame transmitted by the wireless communication terminal, which is an AP, may be the same as that shown in FIG. 8(a). Specifically, the trigger frame transmitted by the wireless communication terminal, which is an AP, may include a frame control field, a duration field, an RA field, a TA field, a Common Info field, at least one Per User Info field User Info 1, . . . User Info N, and an FCS field. As described above, the Common Info field may include a trigger type, and the trigger type of the trigger frame that triggers the link setup may indicate authentication. In addition, the Trigger dependent common info field of the Common Info field may include the association delay information Association delay info. and the authentication sequence information described above.

A wireless communication terminal, which is an AP, and a non-AP wireless communication terminal may operate as shown in FIG. 8(b). The wireless communication terminal, which is an AP, transmits a trigger frame for triggering transmission of an authentication request frame. At this time, the wireless communication terminal, which is an AP, assigns a temporary AID Tmp. AID from a to g to each of a plurality of RUs allocated for transmission of an authentication request frame.

Figure 9:
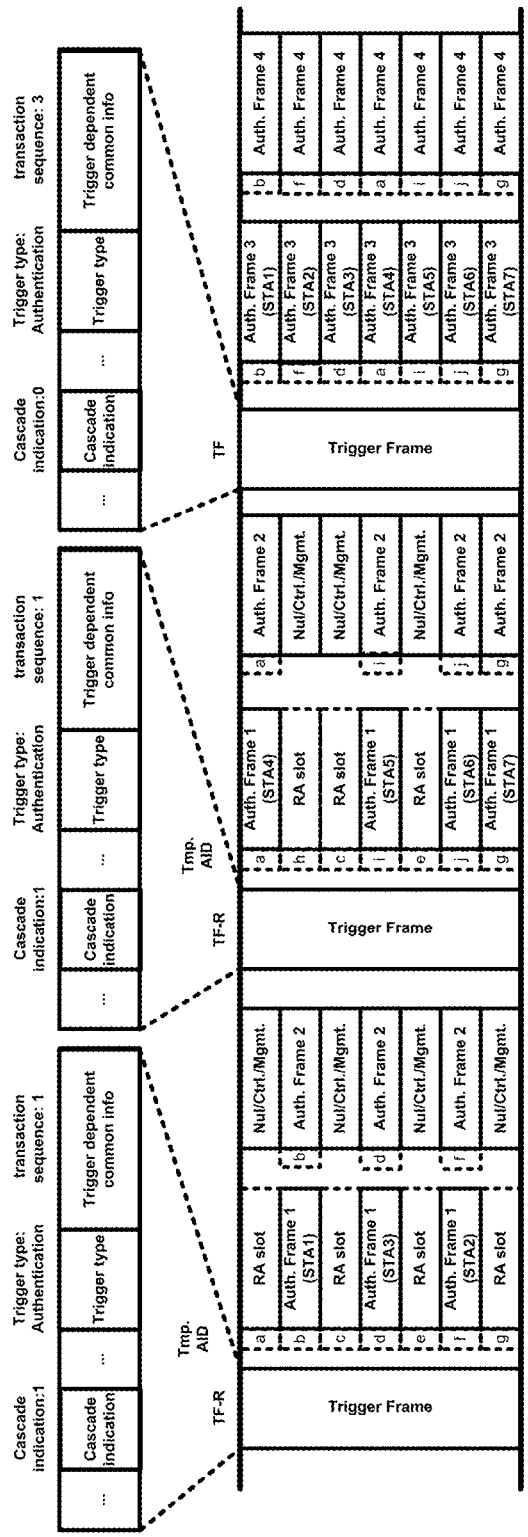
FIG. 9 shows an operation of a wireless communication terminal performing a 4-way handshaking authentication procedure according to an embodiment of the present invention.

FIG. 9 shows an operation of a wireless communication terminal performing a 4-way handshaking authentication procedure according to an embodiment of the present invention.

As described above, when 4-way handshake authentication is used, the wireless communication terminal, which is an AP, may transmit a trigger frame for an authentication procedure after receiving an authentication request frame. At this time, the wireless communication terminal, which is an AP, may receive/transmit a frame required for 4-way handshake authentication using the cascading sequence. The cascading sequence is a transmission sequence that includes both DL transmission and UL transmission within one Transmission Opportunity (TXOP). Within the cascading sequence, DL transmission and UL transmission may proceed in succession.

The wireless communication terminal, which is an AP, may insert authentication sequence information indicating the progress of the authentication procedure in the trigger frame. Specifically, the wireless communication terminal, which is an AP, may insert the authentication sequence information into the trigger dependent common info of the trigger frame. Specifically, the wireless communication terminal, which is an AP, may insert the authentication sequence information into the transaction sequence field of the trigger dependent common info of the trigger frame.

In the embodiment of FIG. 9, the access point AP transmits a trigger frame indicating random access. In addition, the wireless communication terminal, which is an AP, assigns a temporary AID Tmp. AID from a to g to each of a plurality of RUs allocated for transmission of a first authentication frame. At this time, the AP inserts the authentication sequence information indicating that it corresponds to the first sequence of the authentication procedure in the trigger dependent common info field of the trigger frame. Also, the AP sets the Cascade indication bit to 1 indicating that transmission according to the cascading sequence of the trigger frame is continued. The first station STA1 transmits a first authentication frame Auth. Frame 1 through an RU with a temporary AID of b based on the trigger frame. In addition, the second station STA2 transmits a first authentication frame Auth. Frame 1 through the RU with the temporary AID of f based on the trigger frame. In addition, the third station STA3 transmits a first authentication frame Auth. Frame 1 through the RU with the temporary AID of d based on the trigger frame. The AP receives the first authentication frame Auth. Frame 1 from the first station STA1 to the third station STA3, and transmits a second authentication frame Auth. Frame 2 to the first station STA1 to the third station STA3 through DL MU transmission.

The AP transmits a trigger frame that triggers the transmission of the authentication frame again. At this time, the AP further allocates three AIDs h, I, and j having different values from the temporary AID used previously. In addition, the AP inserts the authentication sequence information indicating that it corresponds to the first sequence of the authentication procedure in the Trigger dependent common info field of the trigger frame. Also, the AP sets the Cascade indication bit to 1 indicating that transmission according to the cascading sequence of the trigger frame is continued. The fourth station STA4 transmits a first authentication frame Auth. Frame 1 through an RU with a temporary AID of a based on the trigger frame. In addition, the fifth station STA5 transmits a first authentication frame Auth. Frame 1 through the RU with the temporary AID of i based on the trigger frame. In addition, the sixth station STA6 transmits a first authentication frame Auth. Frame 1 through the RU with the temporary AID of j based on the trigger frame. In addition, the seventh station STA7 transmits a first authentication frame Auth. Frame 1 through the RU with the temporary AID of g based on the trigger frame. The AP receives the first authentication frame Auth. Frame 4 from the fourth station STA4 to the seventh station STA7, and transmits a second authentication frame Auth. Frame 2 to the fourth station STA4 to the seventh station STA7 through DL MU transmission.

The AP transmits a trigger frame that triggers the transmission of a third authentication frame Auth. Frame 3. The AP inserts the authentication sequence information indicating that it corresponds to the third sequence of the authentication procedure in the trigger dependent common info field of the trigger frame. In addition, it signals the RUs allocated to the plurality of stations using the temporary AID used by the station that transmits the first authentication frame Auth. Frame 1. The first station STA1 to the seventh station STA7 transmit a third authentication frame Auth. Frame 3 based on the trigger frame. At this time, the first station STA1 to the seventh station STA7 use the temporary AID previously used. The AP receives a third authentication frame Auth. Frame 3 from the first station STA1 to the seventh station STA7 and transmits a fourth authentication frame Auth. Frame 4 to the first station STA1 to the seventh station STA7.

Figure 10:
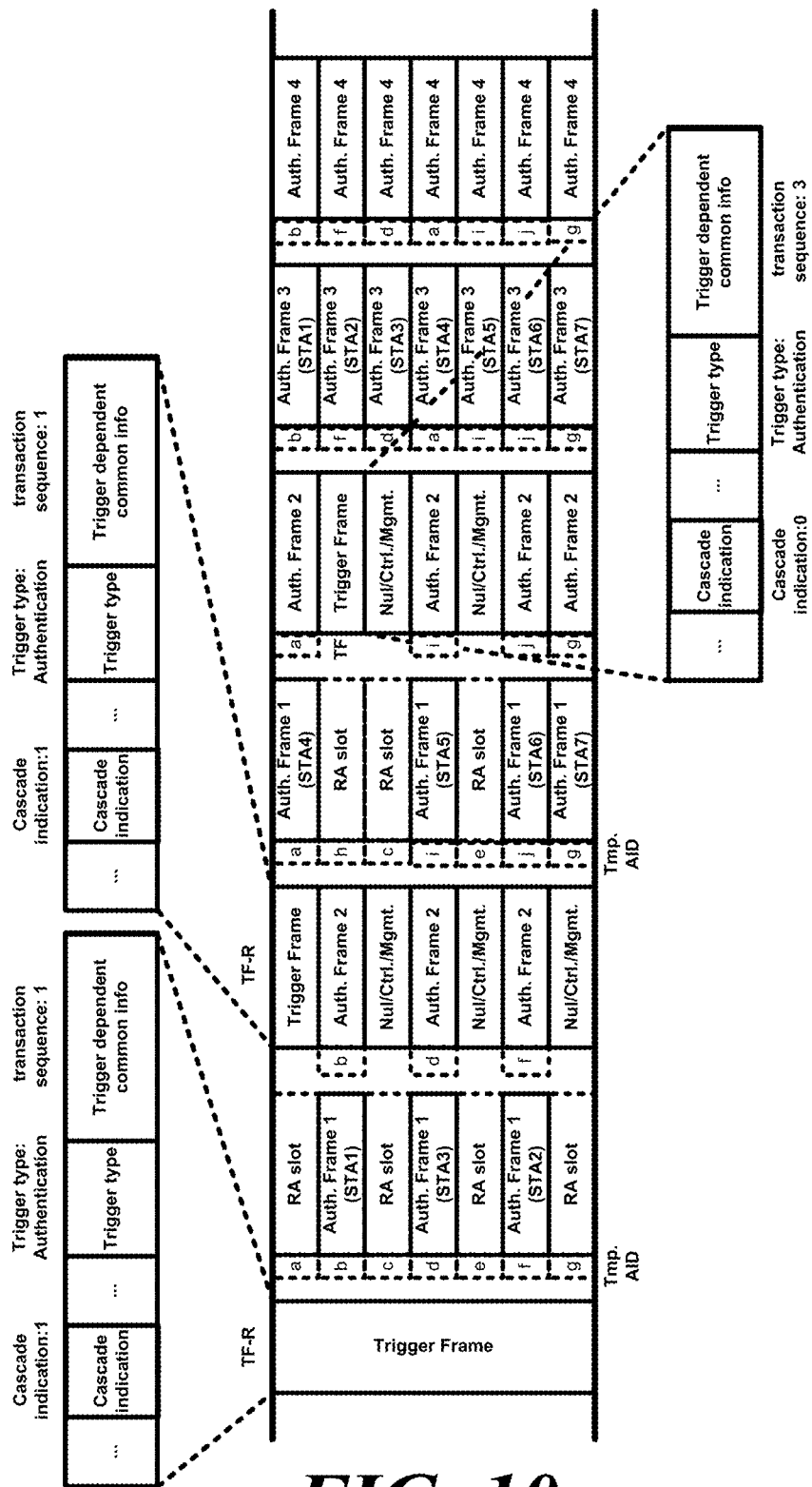
FIG. 10 shows an operation of a wireless communication terminal performing a 4-way handshaking authentication procedure according to another embodiment of the present invention.

FIG. 10 shows an operation of a wireless communication terminal performing a 4-way handshaking authentication procedure according to another embodiment of the present invention.

When a wireless communication terminal, which is an AP, transmits an authentication frame in response to the authentication frame authentication received from a non-AP wireless communication terminal, the wireless communication terminal, which is the AP, may transmit a trigger frame for triggering transmission of an authentication frame through an RU that does not receive the authentication frame from the non-AP wireless communication terminal. As described above, the trigger frame may trigger a random access. In addition, the trigger frame may be a broadcast trigger frame.

In the embodiment of FIG. 10, the AP transmits a trigger frame that triggers the transmission of a first authentication frame Auth. Frame 1. In addition, the wireless communication terminal, which is an AP, assigns a temporary AID Tmp. AID from a to g to each of a plurality of RUs allocated for transmission of a first authentication frame. At this time, the AP inserts the authentication sequence information indicating that it corresponds to the first sequence of the authentication procedure in the Trigger dependent common info field of the trigger frame. Also, the AP sets the Cascade indication bit to 1 indicating that transmission according to the cascading sequence of the trigger frame is continued. The first station STA1 transmits a first authentication frame Auth. Frame 1 through an RU with a temporary AID of b based on the trigger frame. In addition, the second station STA2 transmits a first authentication frame Auth. Frame 1 through the RU with the temporary AID of f based on the trigger frame. In addition, the third station STA3 transmits a first authentication frame Auth. Frame 1 through the RU with the temporary AID of d based on the trigger frame.

The AP receives the first authentication frame Auth. Frame 1 from the first station STA1 to the third station STA3, and transmits a second authentication frame Auth. Frame 2 to the first station STA1 to the third station STA3 through DL MU transmission. At this point, the AP transmits a trigger frame that triggers the transmission of the first authentication frame Auth. Frame 1 together. The AP may insert a wireless communication terminal identifier list indicating a wireless communication terminal to be a DL MU transmission target in the signaling field of the PPDU for DL MU transmission. At this time, the AP may insert a temporary AID used by the first station STA1 to the third station STA3 together with a temporary AID that triggers the authentication frame transmission in the wireless communication terminal identifier list. The remaining operations of the AP and the stations may be the same as that in the embodiment of FIG. 9.

The wireless communication terminal may efficiently perform the 4-way handshake authentication procedure through the embodiments described with reference to FIG. 9 through FIG. 10.

Figure 11:
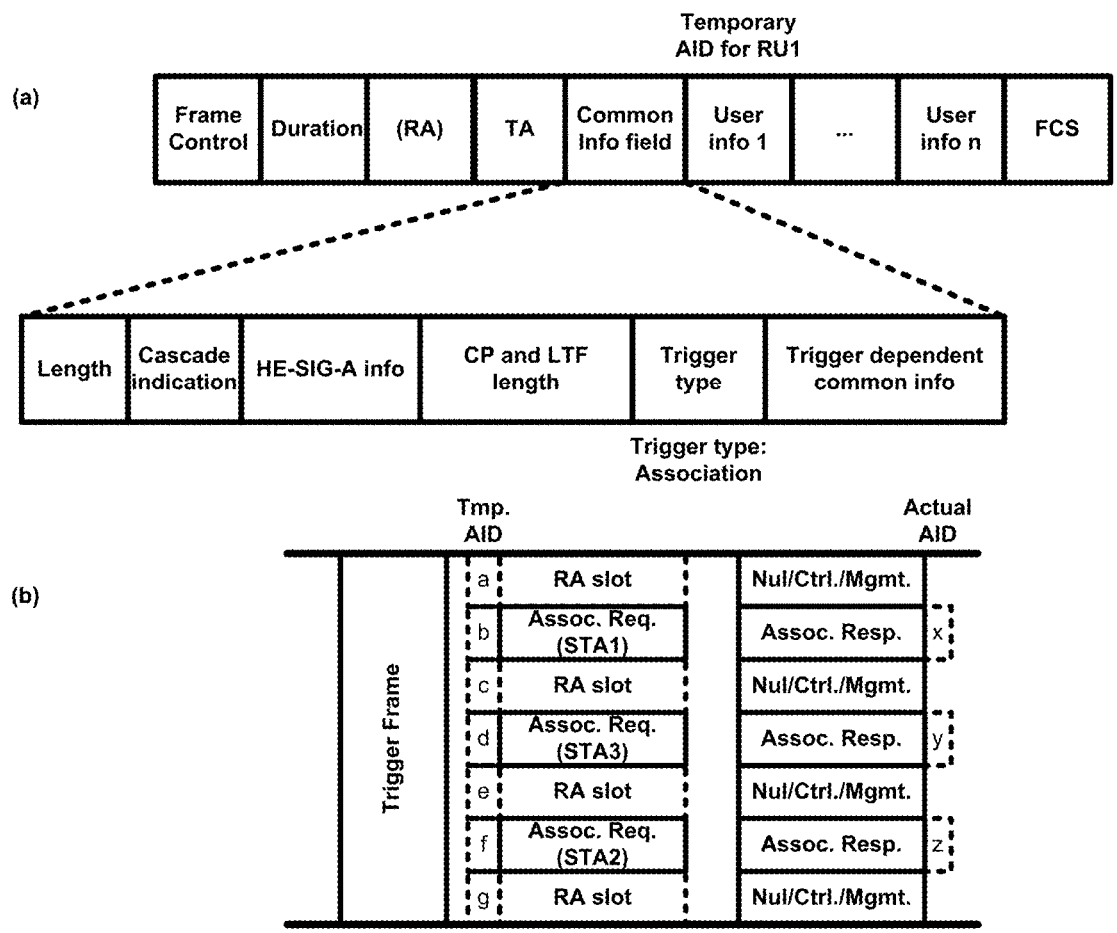
FIG. 11 shows an operation in which a wireless communication terminal performs an association procedure according to an embodiment of the present invention.

FIG. 11 shows an operation in which a wireless communication terminal performs an association procedure according to an embodiment of the present invention.

The wireless communication terminal, which is an AP, may transmit a trigger frame for triggering transmission of an association request frame. At this time, the wireless communication terminal, which is an AP, may set the trigger type to association. The format of the specific trigger frame may be the same as that in the embodiment of FIG. 11(a). The remaining fields of the trigger frame may be the same as that in the embodiment described with reference to FIG. 8(a). The wireless communication terminal, which is an AP, may allocate an AID having a value different from the temporary AID to the wireless communication terminal that transmits the association request frame while transmitting the association response frame. At this time, the AID assigned to the wireless communication terminal is a normal AID, not a temporary AID.

In the embodiment of FIG. 11(b), the AP transmits a trigger frame that triggers the transmission of the association request frame Assoc. Req. In addition, the wireless communication terminal, which is an AP, assigns a temporary AID Tmp. AID from a to g to each of a plurality of RUs allocated for transmission of an authentication request frame Assoc. Req. The first station STA1 transmits an association request frame Assoc. Req. through the RU with a temporary AID of b based on the trigger frame. In addition, the second station STA2 transmits an association request frame Assoc. Req. through the RU with the temporary AID of f based on the trigger frame. In addition, the third station STA3 transmits an association request frame Assoc. Req. through the RU with the temporary AID of d based on the trigger frame.

The AP receives an association request frame Assoc. req. from the first station STA1 to the third station STA3 and transmits an association response frame to the first station STA1 to the third station STA3 through DL MU transmission. At this time, the AP allocates AID x to the first station STA1, allocates AID y to the third station STA3, and allocates AID z to the second station STA2. In the subsequent transmission, the first station SAT1 uses AID x, the second station SAT2 uses AID z, and the third station STA3 uses AID y.

Figure 12:
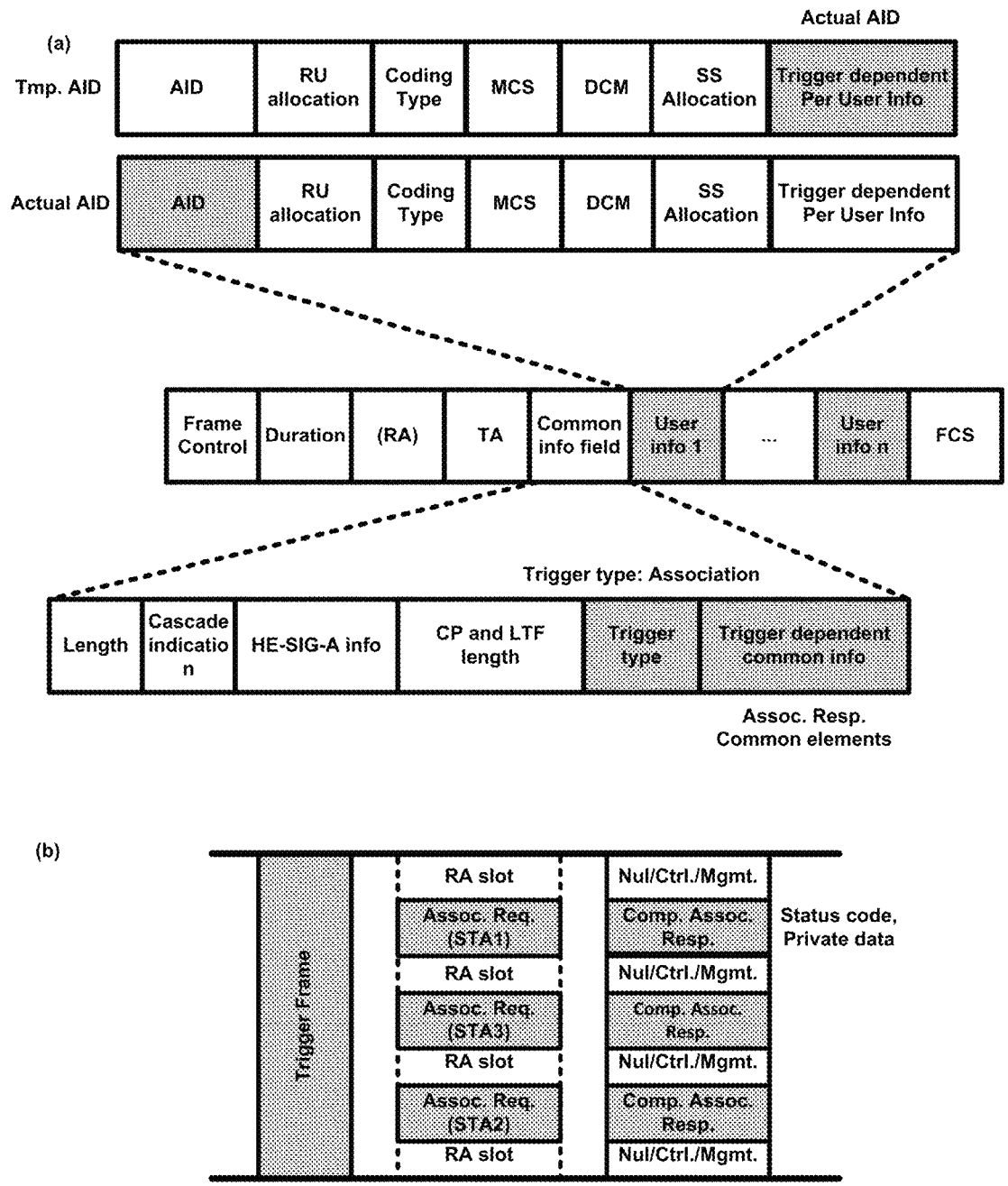
FIG. 12 shows an operation in which a wireless communication terminal performs an association procedure according to an embodiment of the present invention.

FIG. 12 shows an operation in which a wireless communication terminal performs an association procedure according to an embodiment of the present invention.

The wireless communication terminal, which is an AP, transmits information related to the BSS and the AP to the associated wireless communication terminals in the association process. At this time, the information related to the BSS and the AP is transmitted in common during the association process. Accordingly, the wireless communication terminal, which is an AP, may transmit information commonly transmitted to the non-AP wireless communication terminal through a trigger frame that triggers the transmission of the association request frame in the association process. At this time, the information transmitted in common to the non-AP wireless communication terminal in the association process may be at least one of information related to the BSS and the AP. Specifically, a wireless communication terminal, which is an AP, may transmit information commonly transmitted to a non-AP wireless communication terminal through a trigger-dependent common info field in an association process. Also, the wireless communication terminal, which is an AP, may transmit the association response frame excluding the information transmitted in common to the non-AP wireless communication terminal during the association process transmitted through the trigger frame.

Also, when the non-AP wireless communication terminal continues to use the temporary AID after association, the wireless communication terminal, which is an AP, may transmit an association response frame not including the AID field indicating the AID assigned to the associated wireless communication terminal. In addition, the non-AP wireless communication terminals may use AIDs other than temporary AIDs after association. At this time, the wireless communication terminal, which is an AP, may use the temporary AID in the Per User Info field in the trigger frame to signal which wireless communication terminal the corresponding Per User Info corresponds to, and transmit an AID to be used by the wireless communication terminal corresponding to the Per User Info field after association through the Trigger Dependent Per User Info field. At this time, the AID to be used by the corresponding wireless communication terminal may be encrypted and transmitted.

Also, the wireless communication terminal, which is an AP, transmits independent information for each wireless communication terminal associated with the AP through the association response frame. Specifically, the independent information for each wireless communication terminal associated with the AP may be information generated after association. In a specific embodiment, the independent information for each wireless communication terminal associated with the AP may include a status code. The specific form of the trigger frame may be the same as that in FIG. 12(a).

In the embodiment of FIG. 12(b), the AP transmits a trigger frame that triggers the transmission of the association request frame Assoc. Req. In this case, the AP may insert information transmitted in common to the non-AP wireless communication terminal in the association process in the Common Info field of the trigger frame. If the non-AP wireless communication terminal uses the temporary AID even after the association, the AP may insert a temporary AID into the AID field of the Per User info field. In addition, a temporary AID Tmp AID may be inserted in the Per User Info field, and an AID to be used by the wireless communication terminal corresponding to the Per User Info field may be transmitted after the association through the Trigger Dependent Per User Info field. If the AP transmits a response frame, in an association process transmitted through trigger frame, it transmits a compressed association response frame comp. Assoc. Resp., in which information transmitted in common is omitted, to the non-AP wireless communication terminal. At this time, the compressed association response frame comp. Assoc. Resp. includes independent information for each wireless communication terminal, such as a status code associated with the AP. The other operations of the AP and the first station STA1 to the third station STA3 may be the same as those described with reference to FIG. 11(b).

Figure 13:
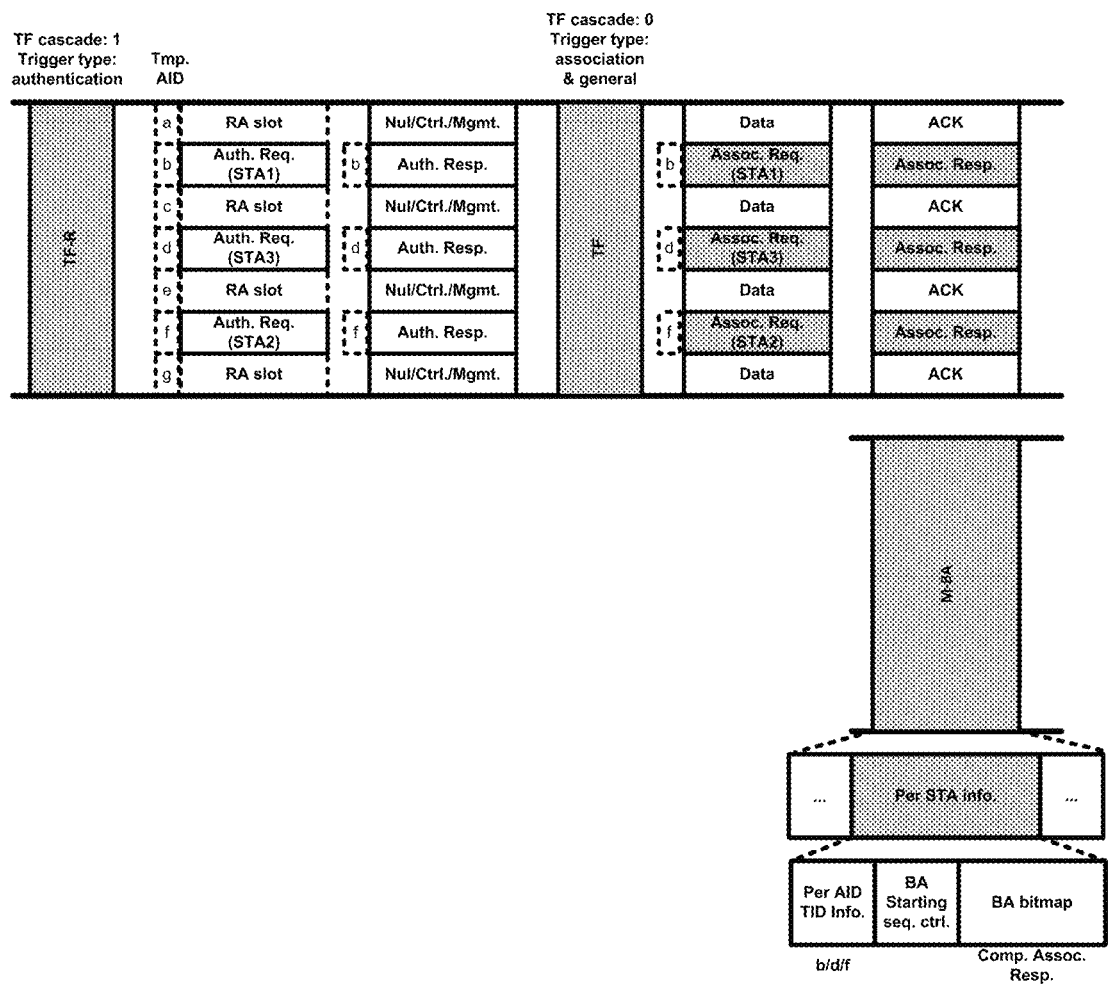
FIG. 13 shows that a wireless communication terminal performs authentication and association using a cascading sequence according to another embodiment of the present invention.

FIG. 13 shows that a wireless communication terminal performs authentication and association using a cascading sequence according to another embodiment of the present invention.

The wireless communication terminal, which is an AP, may continuously perform the authentication procedure and the association procedure through the cascading sequence. At this time, the wireless communication terminal, which is an AP, sets the cascade indication bit to '1' to signal that the cascading sequence is in progress. Further, the wireless communication terminal, which is an AP, may set the trigger type of the trigger frame that triggers the transmission of the authentication request frame to the authentication. Further, the wireless communication terminal, which is an AP, may set the trigger type of the trigger frame that triggers the transmission of the association request frame to the association. Accordingly, the wireless communication terminal, which is an AP, may signal the start of the authentication procedure and the association procedure.

The wireless communication terminal, which is an AP, may trigger transmission of a frame for a link setup via one trigger frame and transmission of a frame not related to the link setup procedure. Specifically, through a trigger frame, the wireless communication terminal may trigger the frame for a link setup through a first RU, and may trigger transmission of a frame not related to the link setup procedure through a second RU. The wireless communication terminal, which is an AP, may trigger association request frame transmission and transmission of a frame irrelevant to the link setup procedure through one trigger frame. At this time, the wireless communication terminal, which is an AP, may adjust at least one of the number of RUs used for transmission of the association request frame and the size of the RU. Also, the wireless communication terminal, which is an AP, may adjust at least one of the number of RUs used for transmission of the association request frame and the size of the RU based on the number of authorized wireless communication terminals. At this time, the wireless communication terminal by which the transmission of the frame irrelevant to the link setup procedure is triggered through the triggering frame may be a wireless communication terminal with a link setyo with the AP. Also, a frame that is irrelevant to the link setting procedure may be a data frame. Also, a frame that is not related to a link setup procedure may be a control frame. In the association procedure after the authentication procedure, when the wireless communication terminal, which is an AP, continues to use the temporary AID used in the authentication procedure, the wireless communication terminal, which is an AP, may trigger association request frame transmission and transmission of a frame irrelevant to the link setup procedure through one trigger frame.

In another specific embodiment, in the association procedure after the authentication procedure, the wireless communication terminal, which is an AP, may discard the temporary AID used in the authentication procedure and trigger a random access through a new temporary AID.

The wireless communication terminal, which is an AP, may transmit a response to the association request frame in OFDMA BA Block ACK. Also, the wireless communication terminal, which is an AP, may transmit a response to the association request frame through the multi-STA BA (M-BA) using the temporary AID used by the wireless communication terminal that transmits the association request frame. At this time, the Per STA Info field of the M-BA includes the BA bitmap, and the wireless communication terminal, which is an AP, may insert the association response frame into the BA bitmap. At this time, the association response frame may be the compressed association response frame described with reference to FIG. 12.

In the embodiment of FIG. 13, the AP performs the authentication procedure with the first station SAT1 to the third station STA3 as in the embodiment described with reference to FIG. 8(b). At this time, the AP sets the cascading indication bit of the trigger frame, which triggers the transmission of the authentication request frame, to 1. Then, the AP may trigger the transmission of the association request frame to the first station STA1 to the third station STA3, and may transmit the trigger frame for triggering the data transmission to the other stations with a link setup with the AP.

The first to third stations STA1 to STA3 transmit an association request frame Assoc. Req. to the AP based on the trigger frame. The wireless communication terminal that triggers the data transmission transmits data to the AP based on the trigger frame.

The AP transmits an association response frame Assoc. Resp. to the first station STA1 to the third station STA3 through the OFDMA BA and transmits an ACK frame to the stations that transmits the data frame. At this time, the AP transmits an association response frame Assoc. Resp. to the first station STA1 to the third station STA3 through the M-BA frame as described above, and transmits an ACK frame to stations that transmit a data frame. Specifically, the AP may transmit an association response frame through the BA bitmap field of the Per STA info field. At this time, the association response frame may be a compressed association response frame comp. Assoc. Resp.

Figure 14:
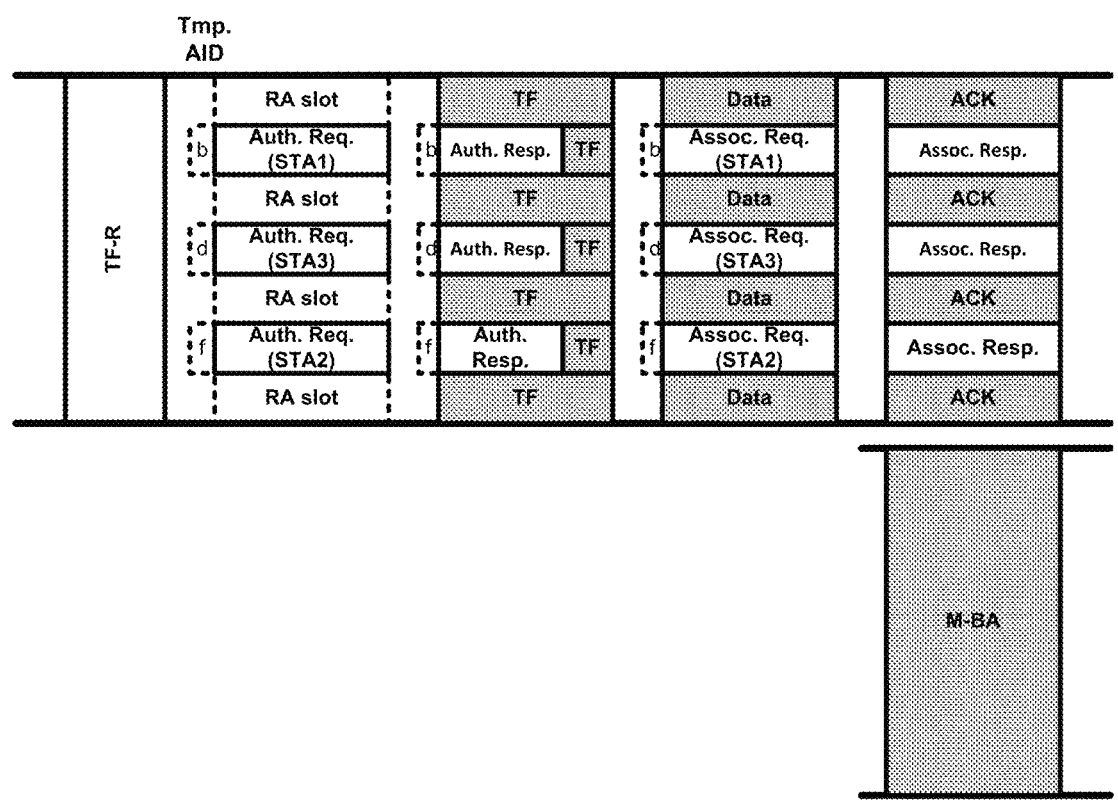
FIG. 14 shows that a wireless communication terminal performs authentication and association using a cascading sequence according to another embodiment of the present invention.

FIG. 14 shows that a wireless communication terminal performs authentication and association using a cascading sequence according to another embodiment of the present invention.

As described above, the wireless communication terminal, which is an AP, may continuously perform the authentication procedure and the association procedure through the cascading sequence. At this time, the wireless communication terminal, which is an AP, may transmit a trigger frame for triggering transmission of an association request frame of a wireless communication terminal receiving an authentication response frame, while transmitting an authentication response frame. Further, while the wireless communication terminal, which is an AP, transmits the authentication response frame, the wireless communication terminal, which is an AP, may transmit a trigger frame that triggers frame transmission not related to a link setup procedure together with an authentication response frame through an OFDMA. At this time, the trigger frame that triggers the frame transmission not related to the link setup procedure may trigger the transmission of the wireless communication terminal with a link setup with the wireless communication terminal, which is an AP.

In the embodiment of FIG. 14, as in the embodiment of FIGS. 8(b) and 13, the AP transmits a trigger frame for triggering the transmission of the authentication request frame Auth. Req. and receives the authentication request frame Auth. Req. from the first station STA1 to the third station STA3. The AP transmits a trigger frame for triggering transmission of an authentication response frame and an association request frame to the first station STA1 to the third station STA3 through OFDMA. At this time, the AP transmits a trigger frame for triggering data frame transmission of a station other than the first station STA1 to the third station STA3 through an RU not used for transmission for the first station STA1 to the third station STA3.

The first to third stations STA1 to STA3 transmit an association request frame Assoc. Req. to the AP based on the trigger frame. The wireless communication terminal that triggers the data transmission transmits data to the AP based on the trigger frame. The operation of the AP may be the same as that described in the embodiment of FIG. 13.

Figure 15:
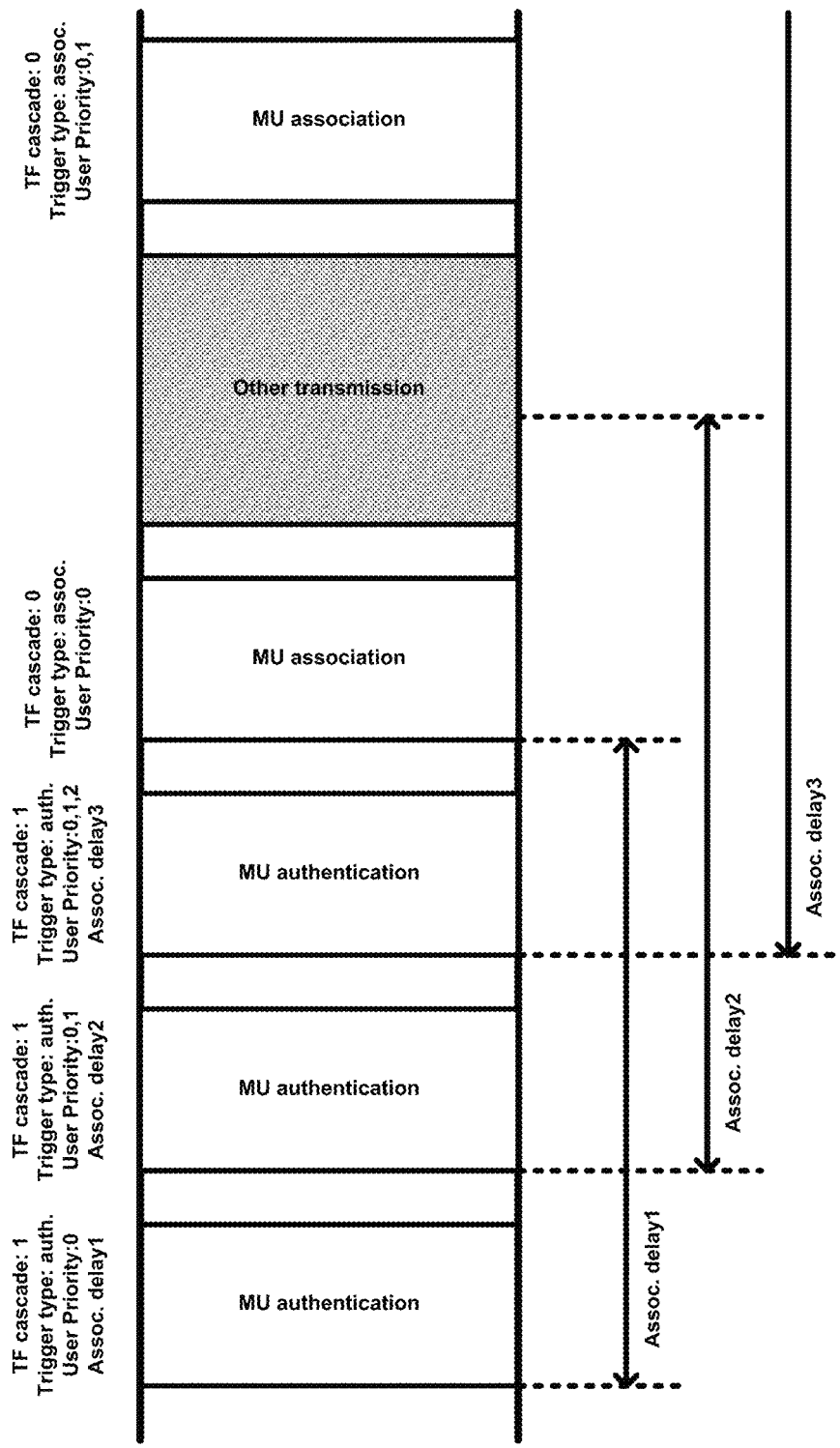
FIG. 15 shows an MU link setup operation of a wireless communication terminal according to another embodiment of the present invention.

FIG. 15 shows an MU link setup operation of a wireless communication terminal according to another embodiment of the present invention.

A wireless communication terminal, which is an AP, may distinguish a plurality of non-AP wireless communication terminals into a plurality of groups and trigger an MU link setting procedure for each group. At this time, the wireless communication terminal, which is an AP, may distinguish the plurality of non-AP wireless communication terminals into a plurality of groups based on the buffer status of the non-AP wireless communication terminals. Specifically, a wireless communication terminal, which is an AP, may distinguish a plurality of non-AP wireless communication terminals into a plurality of groups based on the size of UL data stored in the buffer. In a specific embodiment, a wireless communication terminal, which is an AP, may distinguish a plurality of non-AP wireless communication terminals into a plurality of groups based on whether UL data is stored in the buffer. In another specific embodiment, a wireless communication terminal, which is an AP, may distinguish a plurality of non-AP wireless communication terminals into a plurality of groups based on an access category (AC) of UL data stored in a buffer. Further, the wireless communication terminal, which is an AP, may insert, into the trigger frame, information identifying the group triggered by the trigger frame. Specifically, the wireless communication terminal, which is an AP, may insert information identifying a group triggered by the trigger frame into the Trigger type dependent common info field of the trigger frame, and may insert information identifying the group triggered by the trigger frame into the trigger frame. Also, the wireless communication terminal, which is an AP, may set the association delay time of a group having a relatively high priority to be short. That is, the wireless communication terminal, which is an AP, may set the association delay time of the group having a relatively low priority to be long. At this time, the wireless communication terminal, which is an AP, may signal the association delay time through the association delay information described above. Also, the wireless communication terminal, which is an AP, may signal whether or not the association procedure through the trigger frame is performed through the association delay information. For example, when the value of the field indicating the association delay information is all 1, the association procedure through the trigger frame may be performed. As described above, the non-AP wireless communication terminal obtains the association delay information from the trigger frame, and determines whether to participate in the association procedure based on the trigger frame on the basis of the association delay information.

A wireless communication terminal, which is an AP, and a plurality of non-AP wireless communication terminals may protect data transmission through a MU-Require To Send (RTS) frame and simultaneous Clear To Send (CTS) frame transmission. Embodiments of the present invention will be described with reference to FIGS. 16 to 27.

Figure 16:
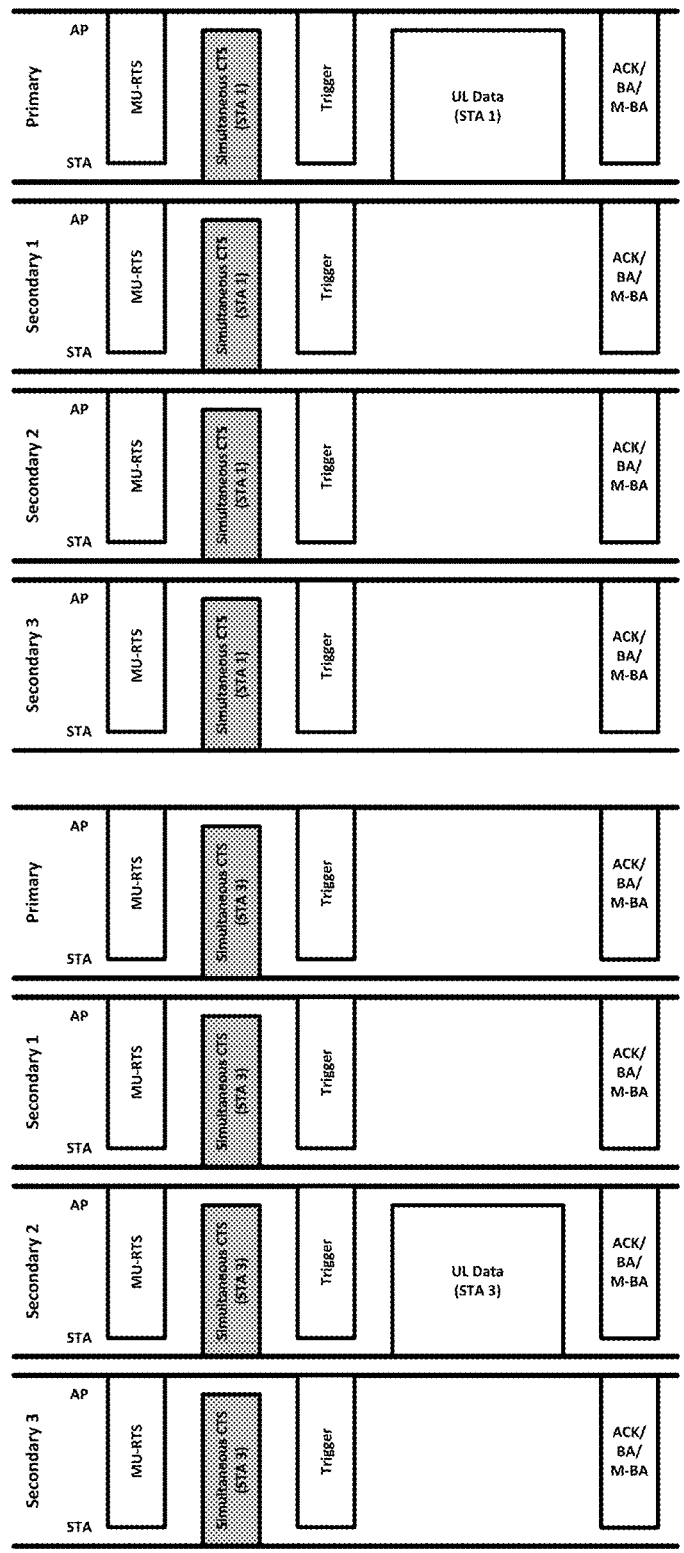
FIG. 16 illustrates an operation of the wireless communication terminal according to the embodiment of the present invention to protect the UL data transmission through the transmission of the MU-RTS frame and the simultaneous CTS frame.

FIG. 16 illustrates an operation of the wireless communication terminal according to the embodiment of the present invention to protect the UL data transmission through the transmission of the MU-RTS frame and the simultaneous CTS frame.

The first wireless communication, which is an AP, may transmit an MU-RTS frame to a plurality of wireless communication terminals to participate in UL MU transmission. A plurality of wireless communication terminals to participate in UL MU transmission may transmit a simultaneous CTS frame in response to an MU-RTS frame. At this time, the wireless communication terminal may transmit a simultaneous CTS frame through a PPDU format of a non-HT PPDU, a non-HT duplicate PPDU, and an HE PPDU. The duration field of the MU-RTS frame and the duration field of the simultaneous CTS frame are used for the NAV setting. Accordingly, the UL MU transmission may be protected from transmission by other wireless communication terminals.

Specifically, a plurality of wireless communication terminals participating in UL MU transmission may transmit a simultaneous CTS frame through an RU indicated by an MU-RTS frame. When a plurality of wireless communication terminals perform UL MU transmission, a plurality of wireless communication terminals may transmit a data frame through an RU indicated by an MU-RTS frame. In a specific embodiment, the wireless communication terminal may transmit a simultaneous CTS frame according to a channel bonding rule. For example, the wireless communication terminal may transmit a simultaneous CTS frame through a contiguous 20 MHz frequency band including a primary channel, a contiguous 40 MHz frequency band including a primary channel, or a contiguous 80 MHz frequency band including a primary channel. In this case, even a plurality of wireless communication terminals that transmit a simultaneous CTS frame at the same time, each of the plurality of wireless communication terminals transmits a simultaneous CTS frame to a different number of 20 MHz frequency bands.

In the embodiment of FIG. 16, the AP transmits an MU-RTS frame to the first station STA1 and the third station STA3. The first station STA1 and the third station STA3 transmit a simultaneous CTS frame through a channel indicated by the MU-RTS frame. At this time, the MU-RTS frame indicates a primary channel Primary to the first station STA1 and a second secondary channel Secondary 2 to the third station STA3. According to the channel bonding rules for simultaneous CTS frame transmission described above, both the first station STA1 and the third station STA3 transmit a simultaneous CTS frame through an 80 MHz frequency band.

When the wireless communication terminal does not participate in transmission and reception, the wireless communication terminal decodes a frame transmitted through only the primary channel of the BSS including the wireless communication terminal and sets the NAV based on the transmitted frame on the main channel Therefore, when a simultaneous CTS frame is not transmitted to the primary channel of another BSS, the wireless communication terminal may fail to set the NAV based on the simultaneous CTS frame even when the secondary channel of another BSS overlaps with the frequency band in which the simultaneous CTS frame is transmitted. Also, since the wireless communication terminal is difficult to know information on the primary channel of another BSS, it is difficult to selectively transmit a simultaneous CTS frame to the primary channel of another BSS. Therefore, even when the MU-RTS frame and the simultaneous CTS frame are transmitted, UL MU transmission may collide with transmission of another BSS. An embodiment for solving such a problem will be described with reference to FIGS. 16 to 19.

Figure 17:
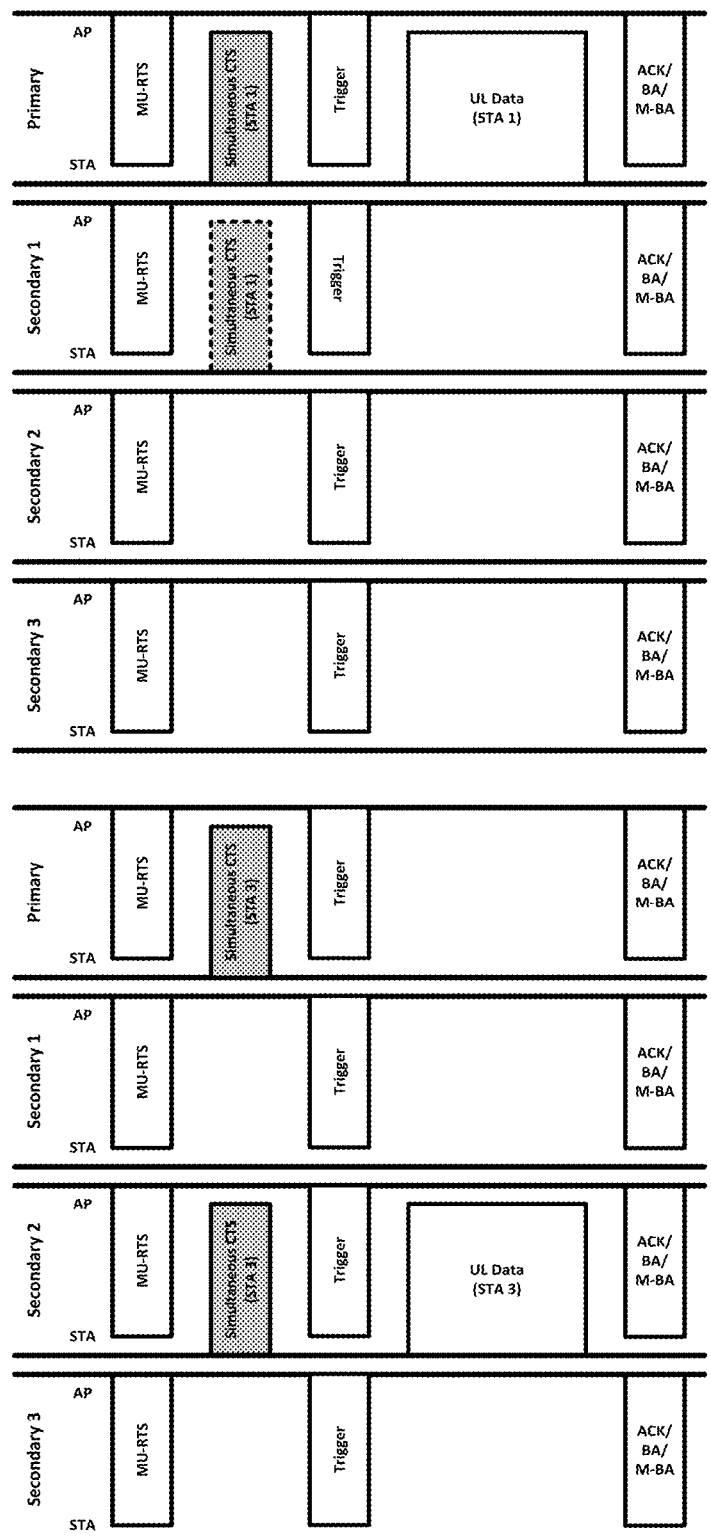
FIG. 17 shows an operation of a wireless communication terminal transmitting a concurrent CTS frame according to an embodiment of the present invention.

FIG. 17 shows an operation of a wireless communication terminal transmitting a simultaneous CTS frame according to an embodiment of the present invention.

The wireless communication terminal may transmit a simultaneous CTS frame through a designated channel and a primary channel through an MU-RTS frame. At this time, the channel designated by the MU-RTS frame, that is, the channel assigned to the wireless communication terminal, may be a channel to be used by the wireless communication terminal for UL MU transmission. Also, when the channel designated by the MU-RTS frame is a primary channel, the wireless communication terminal may transmit a simultaneous CTS frame by selecting a secondary channel or an arbitrary secondary channel of a 20 MHz frequency bandwidth adjacent to the primary channel.

In the embodiment of FIG. 17, the AP transmits an MU-RTS frame to the first station STA1 and the third station STA3. The MU-RTS frame indicates a primary channel to the first station STA1 and indicates a secondary channel Secondary2 to the third station STA3. The first station STA1 transmits a simultaneous CTS frame through a primary channel Primary and a first secondary channel Secondary1. Also, the third station STA3 transmits a simultaneous CTS frame through a secondary channel Secondary2 and a primary channel Primary indicated by the MR-RTS frame. At this time, the first station STA1 may transmit a simultaneous CTS frame by randomly selecting a channel other than the primary channel Primary.

Figure 18:
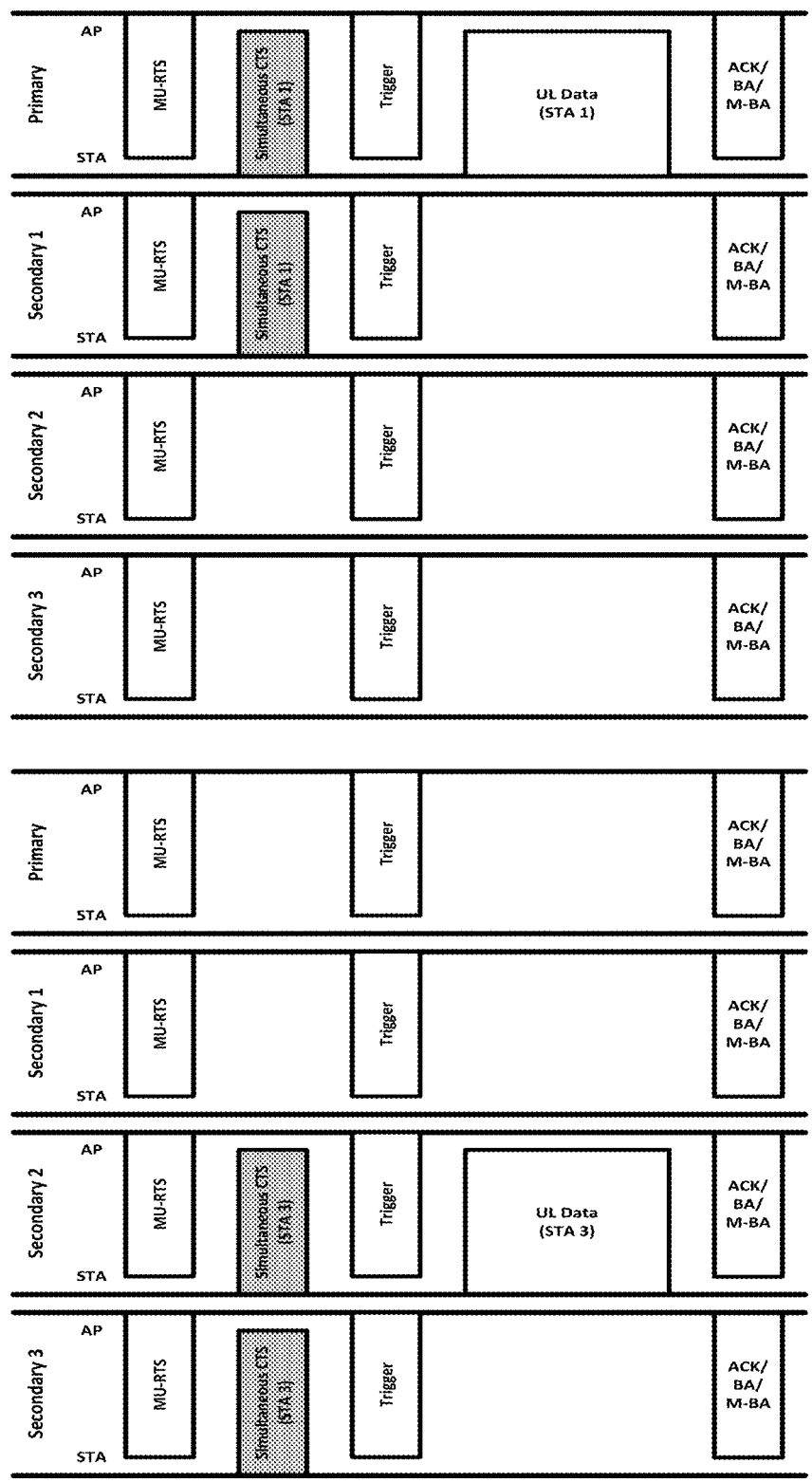
FIG. 18 shows an operation of a wireless communication terminal transmitting a concurrent CTS frame according to another embodiment of the present invention.

FIG. 18 shows an operation of a wireless communication terminal transmitting a simultaneous CTS frame according to another embodiment of the present invention.

Each of the plurality of wireless communication terminals designated by the MU-RTS frame may transmit a simultaneous CTS frame through the same number of channels within the frequency band range allocated by the MU-RTS frame. At this time, the number of channels through which the plurality of wireless communication terminals transmit the simultaneous CTS frame may be determined based on a value obtained by dividing the number of channels included in the frequency band range allocated by the MU-RTS frame by the number of the plurality of wireless communication terminals. For example, when the MU-RTS frame indicates two wireless communication terminals in the range of 80 MHz frequency band, each of the two wireless communication terminals may transmit a simultaneous CTS frame through two channels. In addition, each of the plurality of wireless communication terminals may transmit a simultaneous CTS frame through a channel randomly selected and a channel designated by the MU-RTS frame. In another specific embodiment, each of the plurality of wireless communication terminals may transmit a simultaneous CTS frame through a channel designated by the MU-RTS frame and an expandable channel according to a channel bonding rule.

In the embodiment of FIG. 18, the AP transmits an MU-RTS frame to the first station STA1 and the third station STA3. The MU-RTS frame indicates a primary channel to the first station STA1 and indicates a secondary channel Secondary2 to the third station STA3. The first station STA1 transmits a simultaneous CTS frame through a primary channel Primary and a first secondary channel Secondary1. Also, the third station STA3 transmits a simultaneous CTS frame through the second secondary channel Secondary2 and the third secondary channel Secondary3 indicated by the MR-RTS frame.

Figure 19:
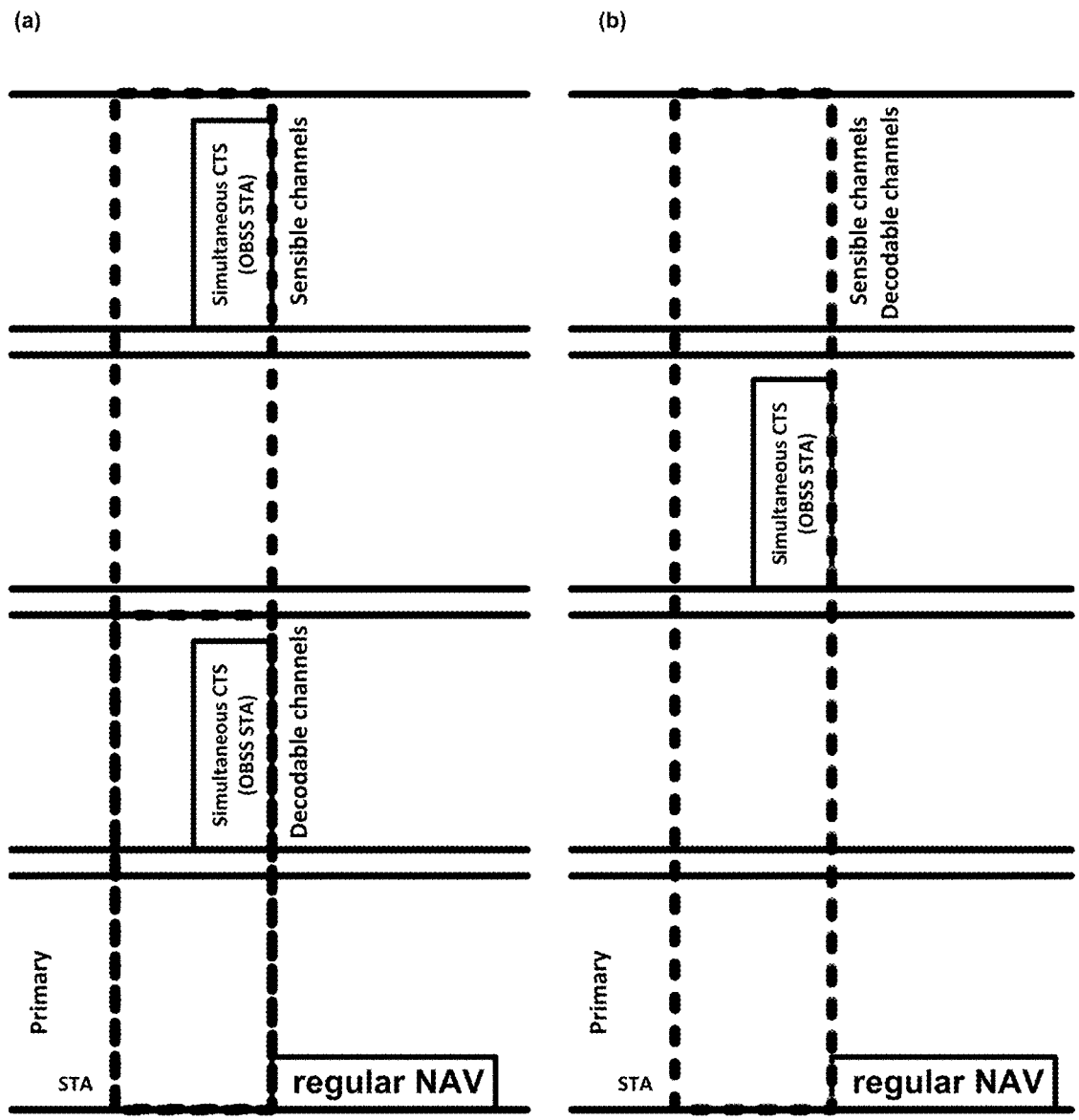
FIG. 19 shows an operation in which a wireless communication terminal sets a NAV according to another embodiment of the present invention.

FIG. 19 shows an operation in which a wireless communication terminal sets a NAV according to another embodiment of the present invention.

As described above, the wireless communication terminal decodes a frame transmitted through a primary channel in a state of not participating in the transmission, and sets a NAV. A wireless communication terminal according to another embodiment of the present invention may decode a primary channel and a frame transmitted through a channel that is sensible by a wireless communication terminal. Specifically, the wireless communication terminal may decode a frame transmitted through a primary channel and at least one secondary channel. At this time, the secondary channel may be an expandable channel according to the channel bonding rule. Another secondary channel may be any channel that the wireless communication terminal may detect.

In the embodiments of FIGS. 19(a) and 19(b), the station may sense an 80 MHz frequency band including the primary channel. In the embodiment of FIG. 19(a), a station decodes a frame transmitted through a primary channel Primary and a secondary channel contiguous to the primary channel Primary, and sets a NAV. At this time, a CTS frame, which is an Inter-BSS frame, is transmitted through the first secondary channel and the third secondary channel Therefore, the station sets the NAV based on the CTS frame transmitted through the first secondary channel. In the embodiment of FIG. 19(b), the station decodes the frame transmitted through all channels that is sensible by the station to set the NAV. At this time, a CTS frame, which is an inter-BSS frame, is transmitted through the second secondary channel Therefore, the station sets the NAV based on the CTS frame transmitted through the second secondary channel. The wireless communication terminal may prevent collision with frames transmitted in the Inter-BSS through these embodiments.

Figure 20:
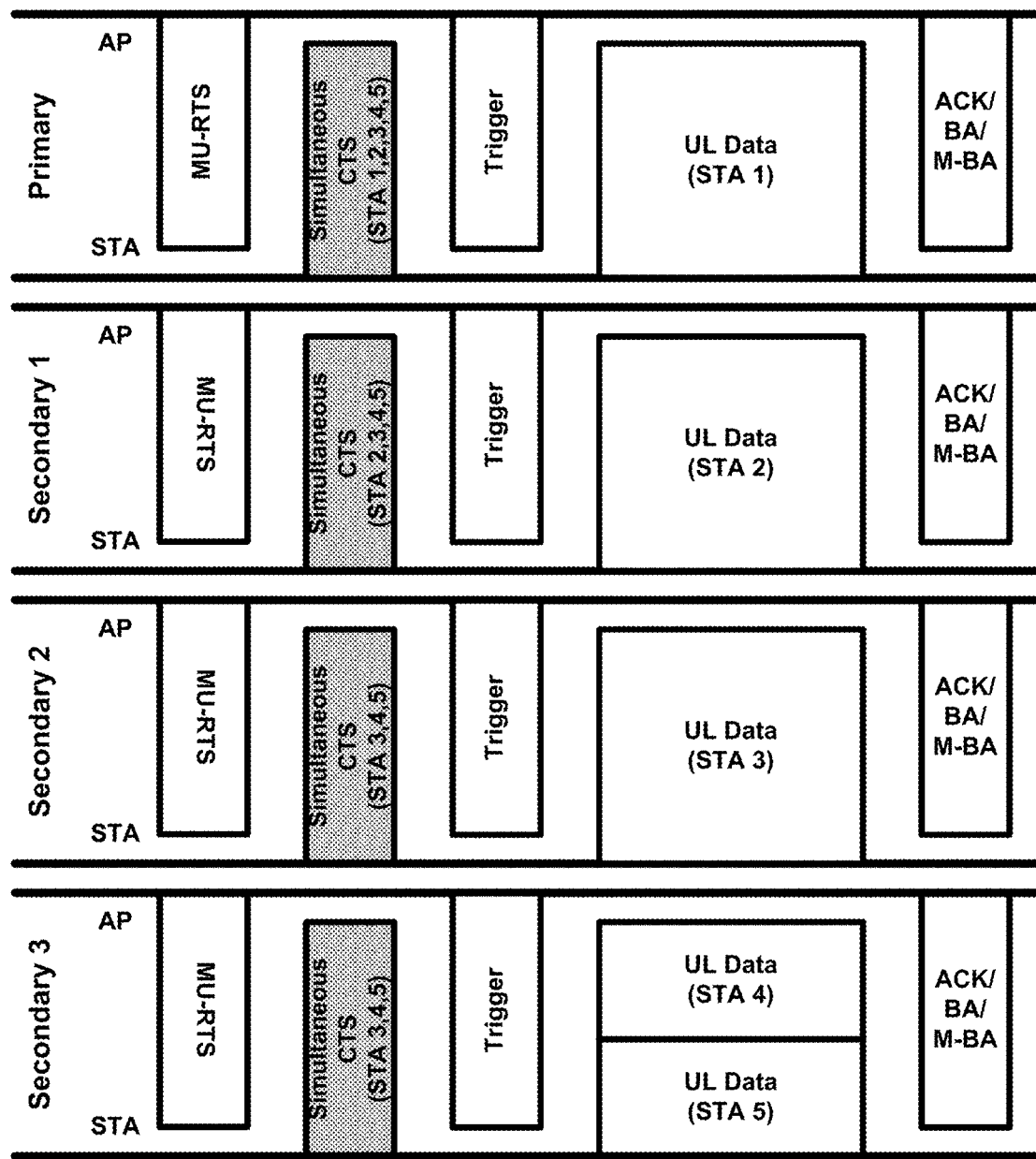
FIG. 20 shows a UL transmission sequence using an MU-RTS frame and a simultaneous CTS frame according to an embodiment of the present invention.

FIG. 20 shows a UL transmission sequence using an MU-RTS frame and a simultaneous CTS frame according to an embodiment of the present invention.

As described above, the AP and the plurality of non-AP wireless communication terminals may protect the data transmission through the MU-RTS frame and simultaneous CTS frame transmission. The first wireless communication, which is an AP, may transmit an MU-RTS frame to a plurality of wireless communication terminals to participate in UL MU transmission. The wireless communication terminal receiving the MU-RTS frame may transmit the simultaneous CTS frame in response to the MU-RTS frame through the RU designated by the MU-RTS frame. At this time, the wireless communication terminal may transmit a simultaneous CTS frame according to the channel bonding rule of the above-described embodiments. The transmission interval between the MU-RTS frame and the CTS frame may be a predetermined time interval. Specifically, the predetermined time interval may be a short inter-frame space (SIFS).

In addition, the AP may trigger a data frame transmission of a plurality of wireless communication terminals by transmitting a trigger frame to a plurality of wireless communication terminals. At this time, the transmission interval between the trigger frame and the data frame may be a predetermined time interval. Specifically, the predetermined time interval may be SIFS. In addition, the transmission interval between the simultaneous CTS frame and the trigger frame may be a predetermined time interval. Specifically, the predetermined time interval may be SIFS.

In the embodiment of FIG. 20, the AP transmits an MU-RTS frame to the first station STA1 to the fifth station STA5. Each of the first to fifth stations STA1 to STA5 transmits a simultaneous CTS frame through an RU indicating an MU-RTS frame to each of the first station STA1 to the fifth station STA5. Specifically, the first station STA1 to the second station STA2 transmit a simultaneous CTS frame through a primary channel Primary and a first secondary channel Secondary1. The third station STA2 to the fifth station STA5 transmit a simultaneous CTS frame through a primary channel Primary, a first secondary channel Secondary1, a second secondary channel Secondary2, and a third secondary channel Secondary3. The AP transmits a trigger frame to the first station STA1 to the fifth station STA5. Each of the first to fifth stations STA1 to STA5 transmits a data frame through an RU that the trigger frame indicates to each of the first station STA1 to the fifth station STA5. The AP transmits an ACK for the data frame to the first station STA1 to the fifth station STA5. Specifically, the AP transmits at least one of an ACK frame, a BA frame and an M-BA frame for a data frame to the first station STA1 to the fifth station STA5. At this time, the transmission between frames is SIFS.

Figure 21:
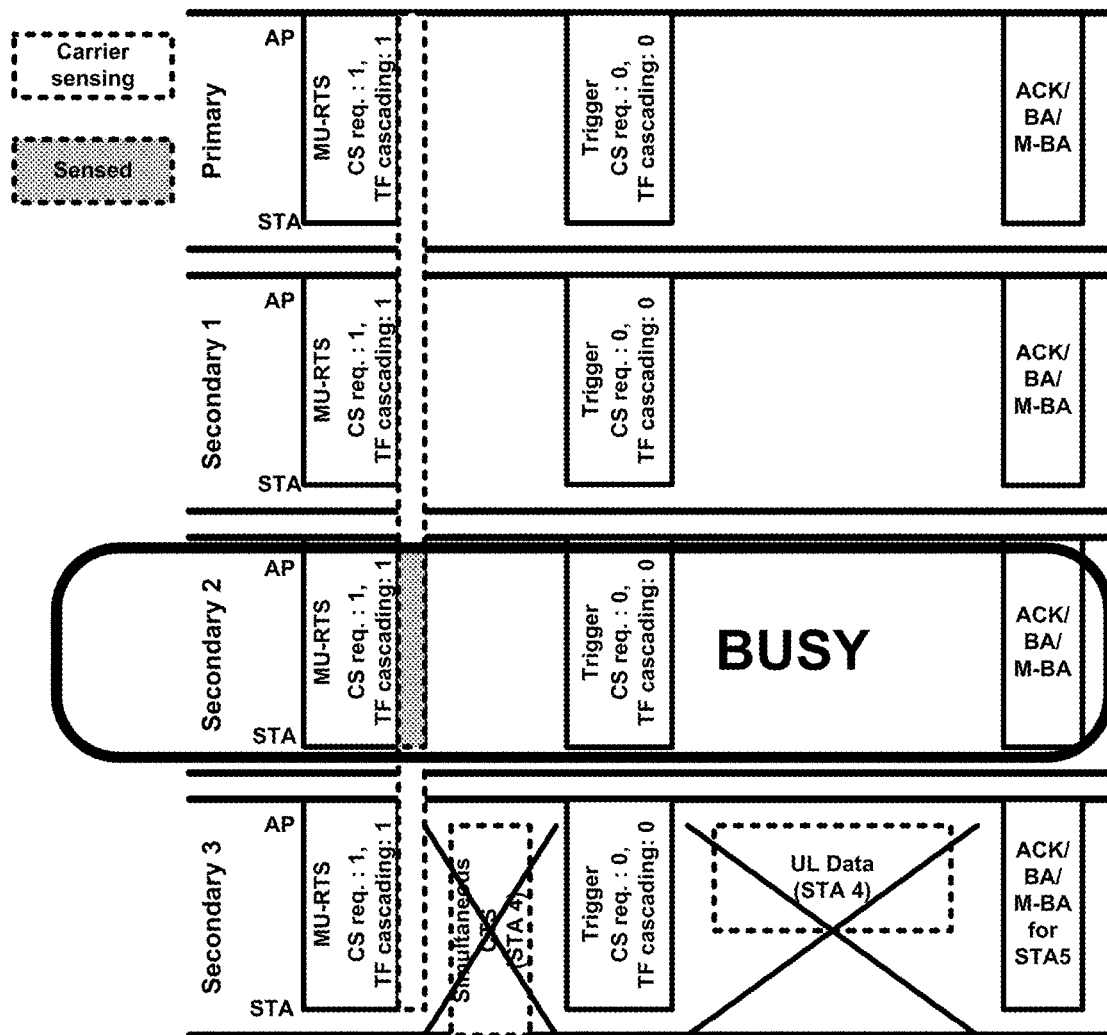
FIG. 21 shows a UL transmission sequence using an MU-RTS frame and a simultaneous CTS frame according to another embodiment of the present invention.

FIG. 21 shows a UL transmission sequence using an MU-RTS frame and a simultaneous CTS frame according to another embodiment of the present invention.

Since the trigger frame triggers the simultaneous transmission of a plurality of wireless communication terminals, the influence of the trigger frame on the transmission of the neighbor BSS may be large. In order to prevent this, the wireless communication terminal, whose transmission is triggered by the trigger frame, may transmit the trigger-based PPDU through the corresponding channel after sensing the channel indicated by the trigger frame. Specifically, when the channel indicated by the trigger frame is idle, the wireless communication terminal, whose transmission is triggered by the trigger frame, may transmit a trigger-based PPDU through the corresponding channel. The MU-RTS frame is a variant of the trigger frame. Accordingly, when the wireless communication terminal transmits a simultaneous CTS frame based on the MU-RTS frame, the wireless communication terminal may transmit the simultaneous CTS frame after sensing the channel indicated by the MU-RTS frame. Specifically, when the channel indicated by the MU-RTS frame is idle, the wireless communication terminal may transmit the simultaneous CTS frame through the channel indicated by the MU-RTS frame.

In addition, the trigger frame may include information indicating whether channel sensing is required. Specifically, the information indicating whether channel sensing is required may be the CS required bit. In a specific embodiment, when the CS required bit is 1, the wireless communication terminal may sense whether the channel indicated by the trigger frame is idle when transmitting a trigger-based PPDU. When a wireless communication terminal, which is an AP, transmits an MU-RTS frame and transmits a trigger frame for triggering transmission of a data frame, the wireless communication terminal, which is an AP, may set the CS required bit included in the MU-RTS frame to 1 and set the CS required bit included in the trigger frame to 0.

In addition, the trigger frame may include the cascading indication bits described above. When a wireless communication terminal, which is an AP, transmits an MU-RTS frame and transmits a trigger frame for triggering transmission of a data frame, the cascading indication bit of the MU-RTS frame may be set to 1. When the cascading indication bit of the MU-RTS frame is set to 1, the wireless communication terminal receiving the MU-RTS frame may determine that the UL transmission based on the trigger frame is on going. Therefore, the wireless communication terminal receiving the MU-RTS frame may reduce the processing time for UL transmission.

In the embodiment of FIG. 21, the AP transmits an MU-RTS frame to the first station STA1 to the fifth station STA5 as in the embodiment of FIG. 20. At this time, the trigger frame includes the CS required bit CS req. In addition, the value of the CS required bit CS req. which is 1 indicates that channel sensing is required before transmission of the trigger-based PPDU. Since the Inter-BSS frame is being transmitted through the second secondary channel Secondary2, the third station STA3 may not transmit the simultaneous CTS frame. In addition, the fourth station STA4, to which the third secondary channel Secondary3 is allocated through the trigger frame, also senses the energy of the inter-BSS frame transmitted through the second secondary channel Secondary2. Therefore, the fourth station STA4 may not also transmit a simultaneous CTS frame. Other stations transmit a simultaneous CTS frame to the AP. Since the AP may not distinguish which station of the fourth station STA4 and the fifth station STA5 the station transmitting the simultaneous CTS frame is in the third secondary channel Secondary3, the AP transmits a trigger frame for triggering the fourth station STA4. At this time, the value of the CS required bit CS req. included in the trigger frame indicates that channel sensing is not required before transmission of the trigger-based PPDU. In addition, only the wireless communication terminals transmitting the simultaneous CTS frames among the first to fifth stations STA1 to STA5 transmit data based on the trigger frame. Therefore, the third station STA3 and the fourth station STA4 do not transmit data frames based on the trigger frame. The operating environment and the basic operation of the embodiment of FIG. 21 are the same as the operating environment and the basic operation of the embodiment of FIG. 20.

Figure 22:
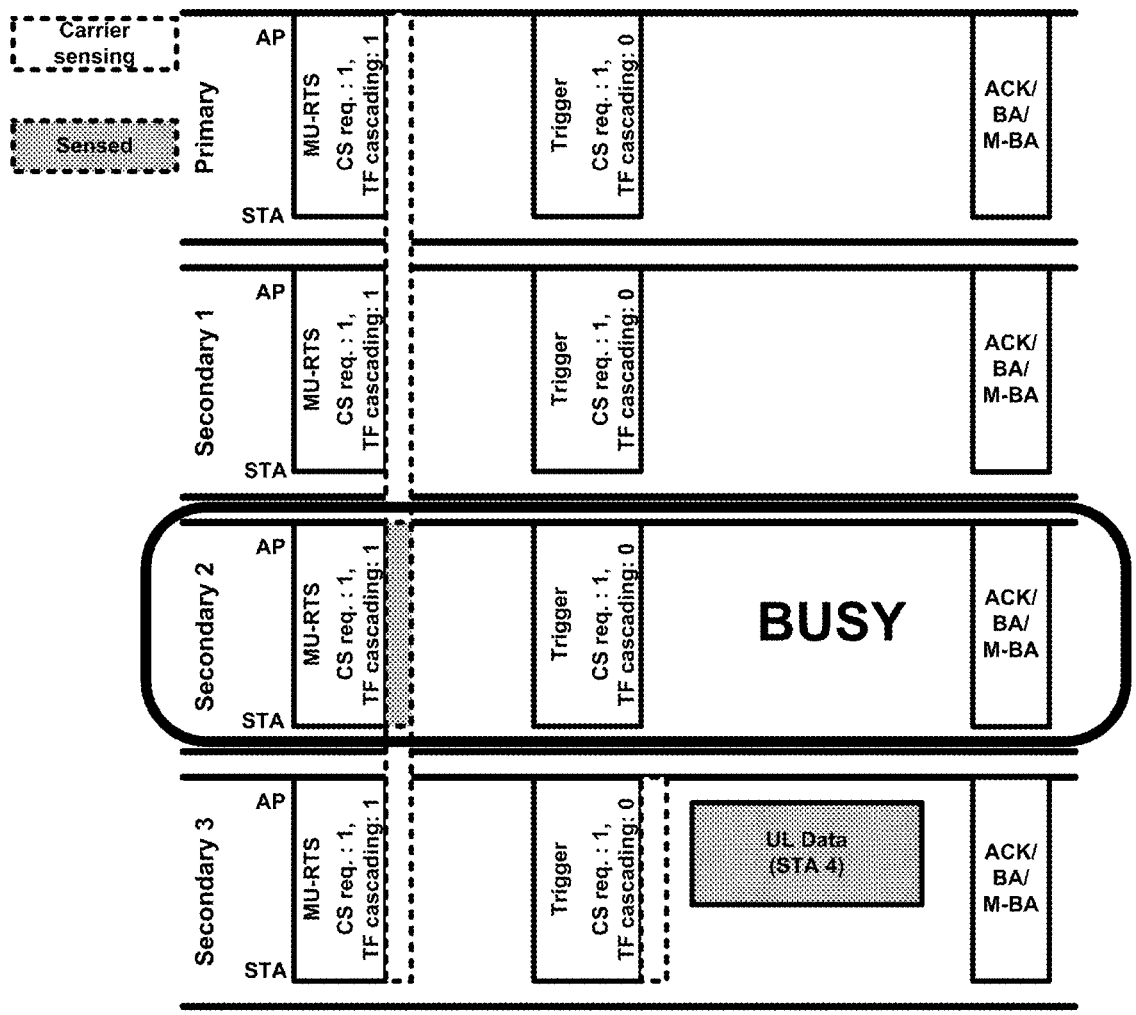
FIG. 22 shows a UL transmission sequence using an MU-RTS frame and a simultaneous CTS frame according to another embodiment of the present invention.

FIG. 22 shows a UL transmission sequence using an MU-RTS frame and a simultaneous CTS frame according to another embodiment of the present invention.

Even when the wireless communication terminal receiving the trigger frame does not transmit the simultaneous CTS frame, if the channel indicated by the trigger frame is idle, the wireless communication terminal receiving the trigger frame may transmit the trigger frame-based PPDU. For this, when a wireless communication terminal, which is an AP, transmits an MU-RTS frame and transmits a trigger frame for triggering transmission of a data frame, the wireless communication terminal, which is an AP, may set the CS required bit included in the MU-RTS frame to 1 and sets the CS required bit included in the trigger frame to 1.

In the embodiment of FIG. 22, the AP sets the value of the CS required bit CS req. of the trigger frame transmitted after receiving the simultaneous CTS frame to 1, unlike the embodiment of FIG. 21. The fourth station STA4 senses whether the third secondary channel Secondary3 indicated by the trigger frame is idle. Since the third secondary channel Secondary3 is idle, the fourth station STA4 transmits a data frame to the AP based on the trigger frame. With this operation, it is possible to increase the transmission efficiency of the PPDU based on the trigger frame. The operating environment and the basic operation of the embodiment of FIG. 22 are the same as the operating environment and the basic operation of the embodiment of FIG. 20.

Figure 23:
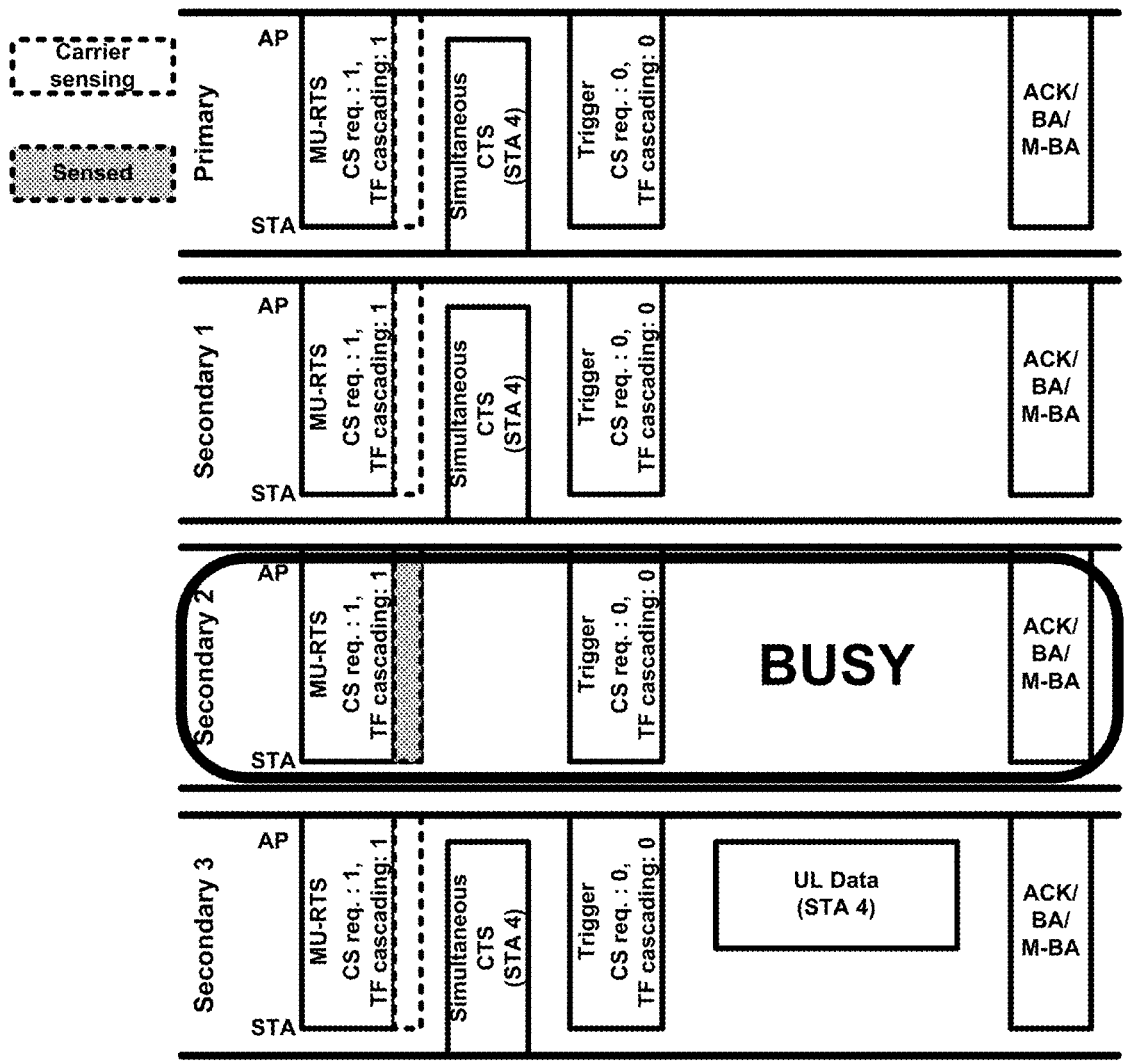
FIG. 23 shows a UL transmission sequence using an MU-RTS frame and a simultaneous CTS frame according to another embodiment of the present invention.

FIG. 23 shows a UL transmission sequence using an MU-RTS frame and a simultaneous CTS frame according to another embodiment of the present invention.

The wireless communication terminal may sense whether the corresponding channel is idle for each 20 MHz channel of the channel designated by the MU-RTS frame and transmit the simultaneous CTS frame through only the idle 20 MHz channel irrespective of the channel bonding rule. Specifically, the wireless communication terminal may sense whether the corresponding channel is idle for each 20-MHz channel, and transmit a simultaneous CTS frame through the idle 20-MHz channel even when the idle channel is contiguous including the primary channel. At this time, when a wireless communication terminal, which is an AP, transmits an MU-RTS frame and transmits a trigger frame for triggering transmission of a data frame, the wireless communication terminal, which is an AP, may set the CS required bit included in the MU-RTS frame to 1 and sets the CS required bit included in the trigger frame to 0.

Specifically, in the embodiment of FIG. 23, the MU-RTS frame triggers to transmit a simultaneous CTS frame to the fourth station STA4 through the primary channel Primary and the first secondary channel Secondary1 to the third secondary channel Secondary3. At this time, unlike the embodiment of FIGS. 21 and 22, the fourth station STA4 transmits a simultaneous CTS frame through the remaining channels except for the busy second secondary channel Secondary2. Then, the fourth station STA4 transmits a data frame to the AP through the third secondary channel Secondary3 based on the trigger frame. The operating environment and the basic operation of the embodiment of FIG. 23 are the same as the operating environment and the basic operation of the embodiment of FIG. 20.

Figure 24:
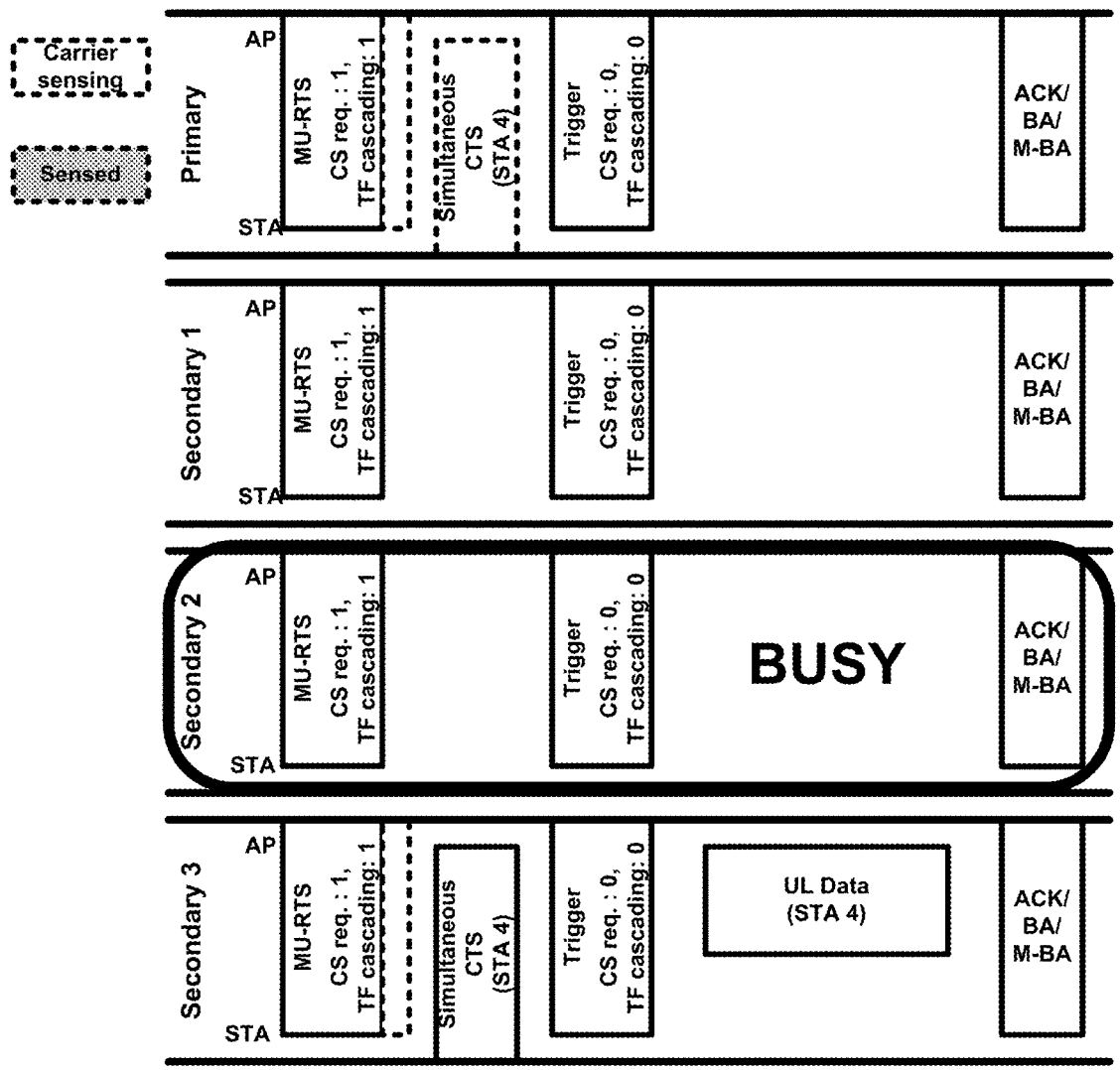
FIG. 24 shows a UL transmission sequence using an MU-RTS frame and a simultaneous CTS frame according to another embodiment of the present invention.

FIG. 24 shows a UL transmission sequence using an MU-RTS frame and a simultaneous CTS frame according to another embodiment of the present invention.

Regardless of the channel bonding rule described above for the non-AP wireless communication terminal, the wireless communication device, which is an AP, may transmit an MU-RTS frame triggering simultaneous CTS frame transmission through a channel through which a non-AP wireless communication terminal transmits a data frame. At this time, the non-AP wireless communication terminal may selectively transmit a simultaneous CTS frame through the primary channel.

In the embodiment of FIG. 24, the MU-RTS frame triggers to transmit a simultaneous CTS frame to the fourth station STA4 through the third secondary channel Secondary3. At this time, the fourth station STA4 transmits a simultaneous CTS frame through a third secondary channel Secondary3. Then, the fourth station STA4 transmits a data frame to the AP through the third secondary channel Secondary3 based on the trigger frame. In addition, the fourth station STA4 may selectively transmit a simultaneous CTS frame through a primary channel Primary as well as a third secondary channel Secondary3. The operating environment and the basic operation of the embodiment of FIG. 24 are the same as the operating environment and the basic operation of the embodiment of FIG. 20.

Figure 25:
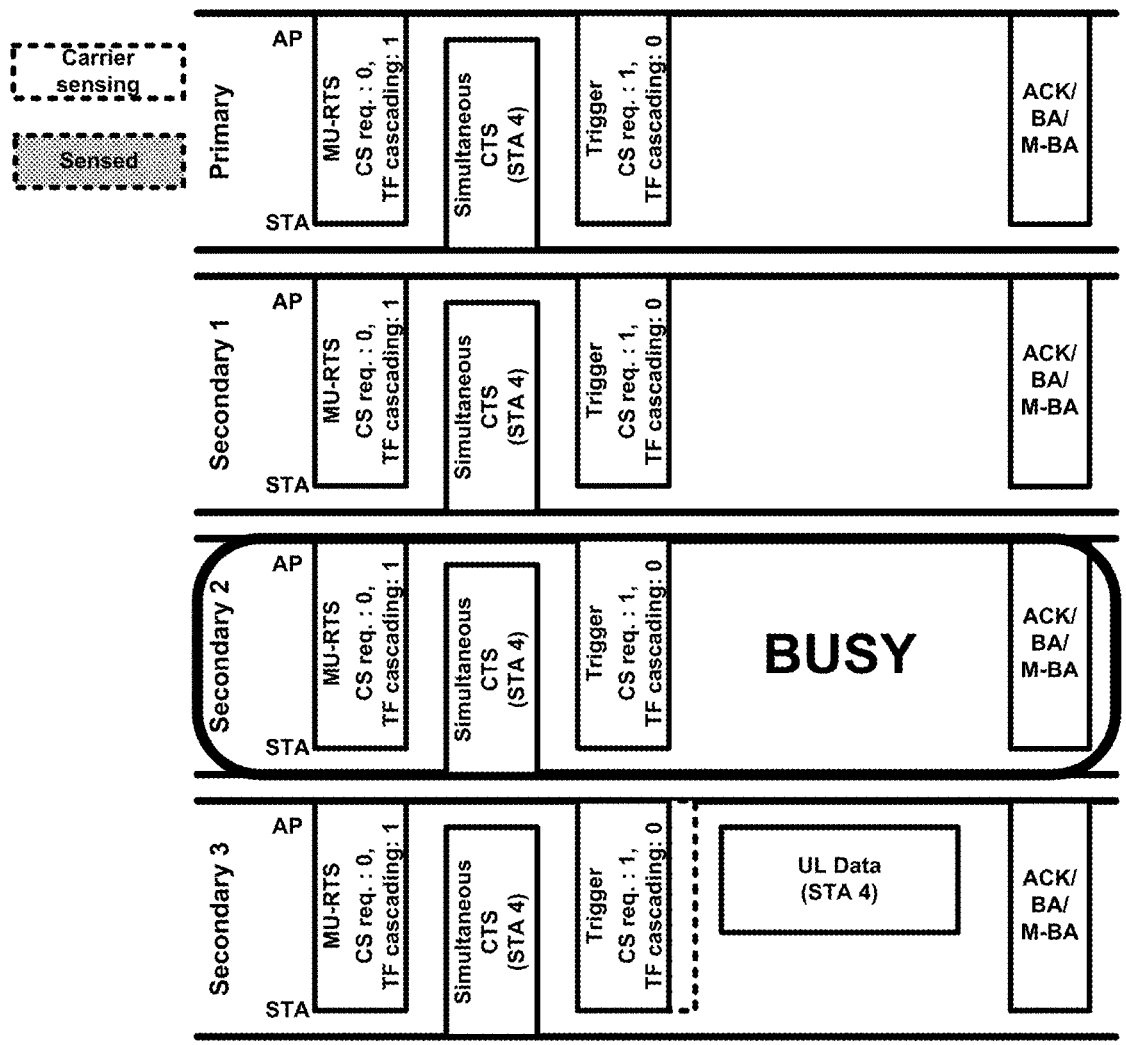
FIGS. 25 to 27 show a UL transmission sequence using an MU-RTS frame and a simultaneous CTS frame according to another embodiment of the present invention.

FIG. 25 shows a UL transmission sequence using an MU-RTS frame and a simultaneous CTS frame according to another embodiment of the present invention.

When a wireless communication terminal, which is an AP, transmits an MU-RTS frame and transmits a trigger frame for triggering transmission of a data frame, the wireless communication terminal, which is an AP, may set the CS required bit included in the MU-RTS frame to 0 and sets the CS required bit included in the trigger frame to 1. Through this, it may actively protect UL MU PPDU transmissions.

In the embodiment of FIG. 25, the AP sets the CS required bit CS req. of the MU-RTS frame to 0. Accordingly, each of the first to fifth stations STA1 to STA5 does not perform channel sensing, and transmits a simultaneous CTS frame through an RU indicated by the MU-RTS frame to each of the first station STA1 to the fifth station STA5. At this time, each of the first to fifth stations STA1 to STA5 transmits a simultaneous CTS frame after SIFS from the time of receiving the MU-RTS frame without channel sensing. Therefore, the fourth station STA4 transmits a simultaneous CTS frame through the second secondary channel Secondary2 being used by another wireless communication terminal.

In addition, the AP sets the CS required bit CS req. of the trigger frame to 1. Accordingly, after channel sensing, when the RUs that the MU-RTS frame indicates to the first station STA1 to the fifth station STA5 are idle, each of the first to fifth stations STA1 to STA5 transmits a simultaneous data frame through the corresponding RU. Therefore, the fourth station STA4 transmits the data frame through the third secondary channel Secondary3. The operating environment and the basic operation of the embodiment of FIG. 25 are the same as the operating environment and the basic operation of the embodiment of FIG. 20.

Figure 26:
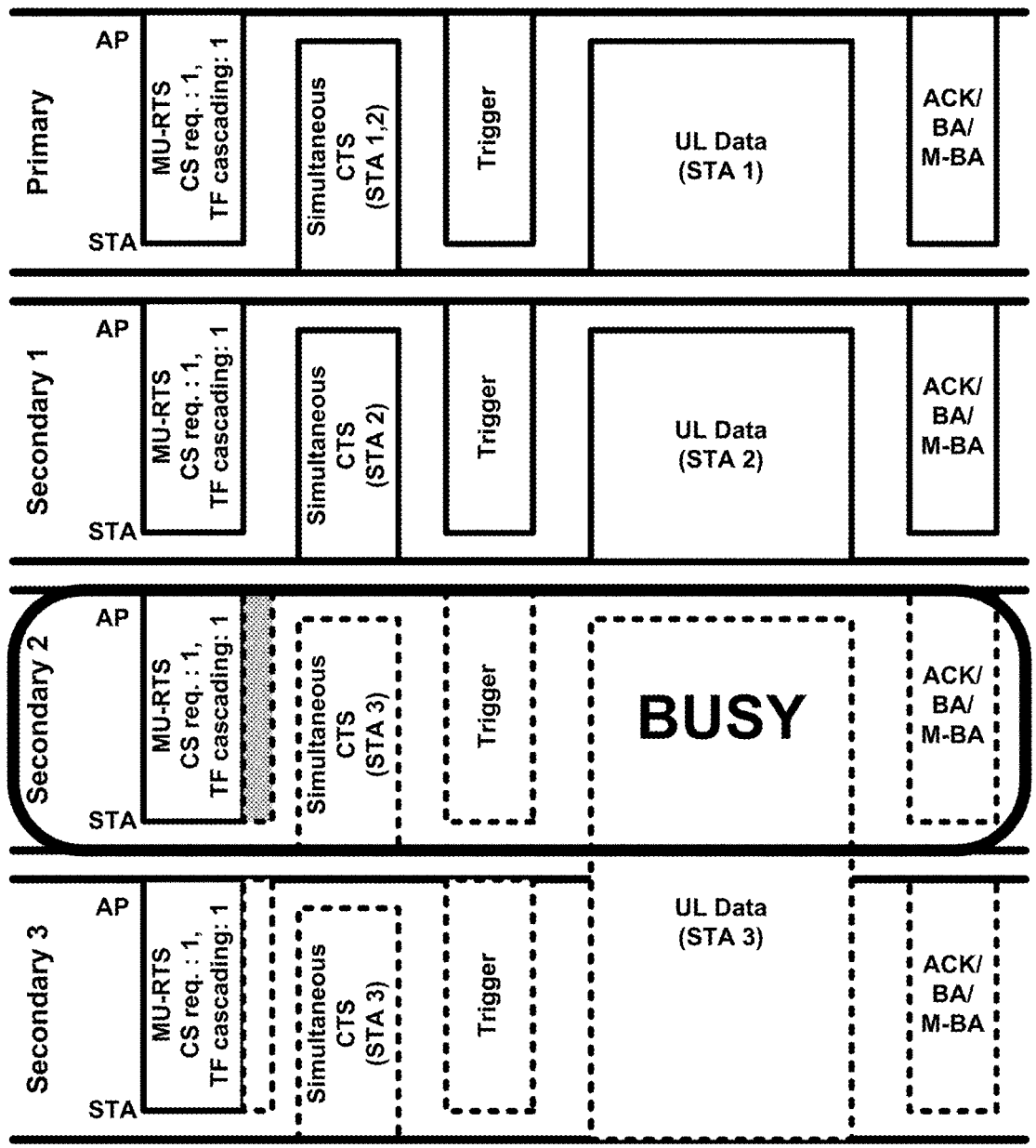

FIG. 26 shows a UL transmission sequence using an MU-RTS frame and a simultaneous CTS frame according to another embodiment of the present invention.

When the RU indicated by the trigger frame is a frequency band of 20 MHz or more and some of the frequency bands are busy, the wireless communication terminal receiving the trigger frame with a CS required bit set to 1 may not transmit the PPDU based on the trigger frame. Specifically, when the RU indicated by the MU-RTS frame is a frequency band of 20 MHz or more and some of the frequency bands are busy, the wireless communication terminal receiving the MU-RTS frame with the CS required bit set to 1 may not transmit a simultaneous CTS frame. At this time, the AP does not transmit the trigger frame for the 20 MHz channel that does not receive the simultaneous CTS frame. Therefore, a wireless communication terminal that may not transmit a simultaneous CTS frame may not transmit a data frame based on a trigger frame.

In the embodiment of FIG. 26, the AP transmits an MU-RTS frame to the first station STA1 to the third station STA3. At this time, the AP sets the CS required bit included in the MU-RTS frame to 1. The MU-RTS frame signals the first station STA1 to transmit a simultaneous CTS frame through a primary channel Primary, and signals the second station STA2 to transmit a simultaneous CTS frame through the primary channel Primary and the first secondary channel Secondary1. In addition, the MU-RTS frame signals the third station STA3 to transmit a simultaneous CTS frame through the second secondary channel Secondary2 and the third secondary channel Secondary3. The first station STA1 transmits a simultaneous CTS frame through a primary channel Primary, and the second station STA2 transmits a simultaneous CTS frame through the primary channel Primary and the first secondary channel Secondary1. The third station STA3 senses whether the second secondary channel Secondary2 and the third secondary channel Secondary3 are idle. Since the secondary channel Secondary2 is busy, the third station STA3 does not transmit the simultaneous CTS frame through the second secondary channel Secondary2 and the third secondary channel Secondary3. Therefore, the AP does not trigger the transmission of data frames through the second secondary channel Secondary2 and the third secondary channel Secondary3 to the first station SAT1 and the second station STA2, and transmits a trigger frame for triggering a data frame transmission through a primary channel Primary and a first secondary channel Secondary1. The first station SAT1 and the second station STA2 transmit the data frame based on the trigger frame. At this time, since the second secondary channel Secondary2 and the third secondary channel Secondary3 are not used in the UL transmission, the channel utilization efficiency may be lowered. An embodiment for solving this will be described with reference to FIG. 27.

Figure 27:
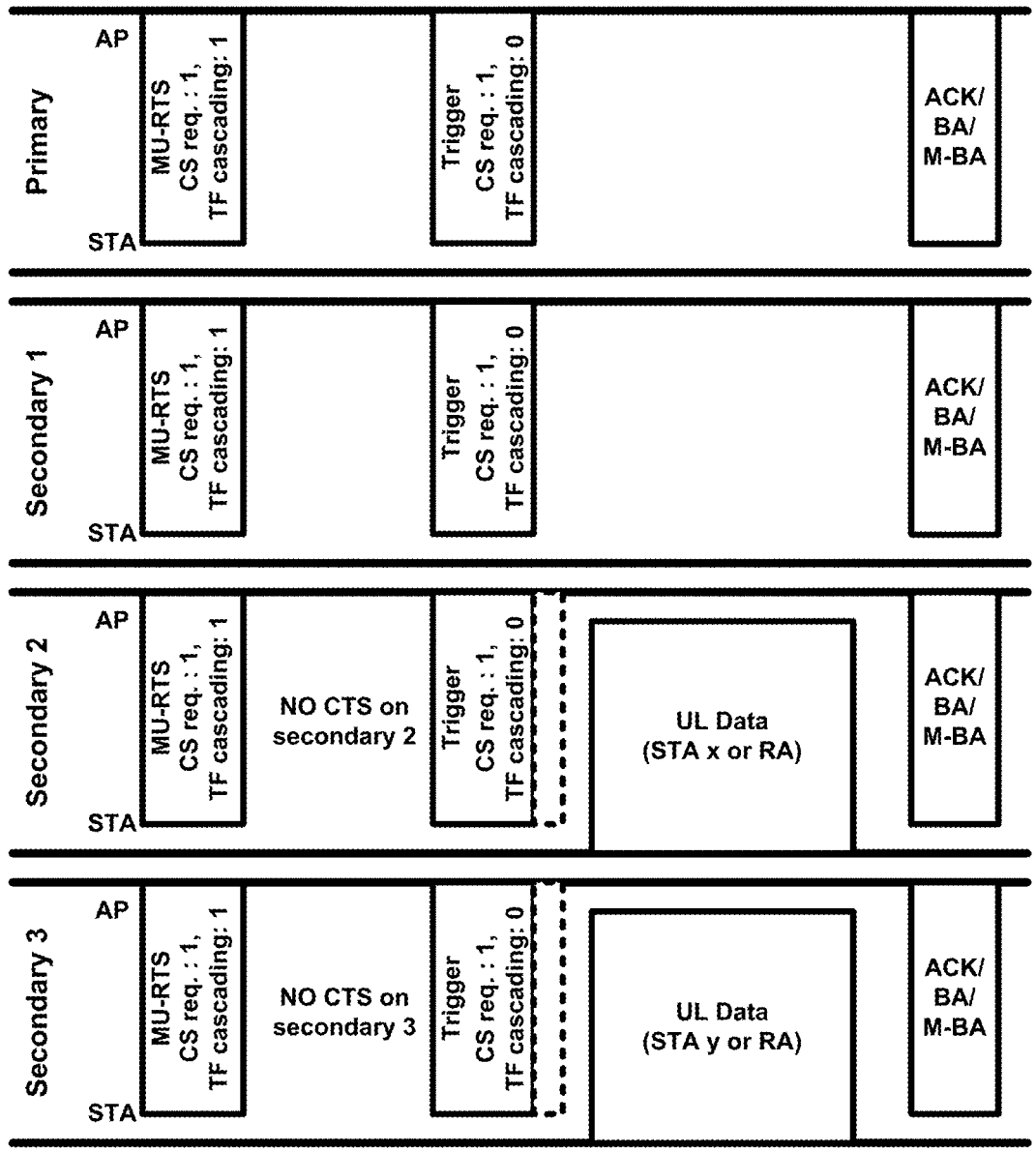

FIG. 27 shows a UL transmission sequence using an MU-RTS frame and a simultaneous CTS frame according to another embodiment of the present invention.

When there is a channel through which the simultaneous CTS frame is not received in response to the MU-RTS frame, the wireless communication terminal, which is an AP, may trigger UL transmission through the corresponding channel through the trigger frame. At this time, the wireless communication terminal, which is an AP, that does not trigger simultaneous CTS frame transmission by the MU-RTS frame through the trigger frame may trigger UL transmission over the channel through which no simultaneous CTS frame is received in response to the MU-RTS frame. In addition, the wireless communication terminal, which is an AP, that previously transmits a Buffer Status Report (BSR) through a trigger frame may trigger UL transmission over the channel through which a simultaneous CTS frame is not received in response to the MU-RTS frame. Also, the wireless communication terminal, which is an AP, may trigger a random access UL transmission over a channel through which the simultaneous CTS frame is not received in response to an MU-RTS frame through a trigger frame.

In these embodiments, the wireless communication terminal, which is an AP, may set the CS required bit of the trigger frame to 1. This makes it possible to prevent a transmission collision with another wireless communication terminal in a channel through which a simultaneous CTS frame is not transmitted.

In the embodiment of FIG. 27, the operations of the AP and the first to third stations STA 1 to STA 3 are the same until the transmission of the trigger frame. However, in the embodiment of FIG. 27, the AP transmits a trigger frame signaling UL transmission through the second secondary channel Secondary 2 and the third secondary channel Secondary 3. At this time, the trigger frame signaling the UL transmission through the second secondary channel Secondary 2 and the third secondary channel Secondary 3 may trigger the random access UL transmission. In another specific embodiment, a trigger frame that signals UL transmission through a secondary channel Secondary 2 and a third secondary channel Secondary3 may trigger the UL transmission of wireless communication terminals other than the first and second stations STA 1 to STA 3.

The wireless communication terminal may determine which traffic should be transmitted according to the priority of the traffic. Specifically, the priority of traffic is determined by the characteristics of the traffic. The priority of traffic is referred to as an access class (AC). The AC may be determined based on at least one of transmission frequency, delay, accuracy, and data size. In a specific embodiment, the wireless communication terminal may determine a transmission order by obtaining a backoff counter for each traffic in the buffer of the wireless communication terminal. At this time, the range of values that the backoff counter may have depends on the AC of the traffic. Specifically, the maximum value that the backoff (BO) counter value of the traffic corresponding to the AC having the high priority may have is smaller than the maximum value that the backoff counter value of the traffic corresponding to the AC having the relatively low priority may have.

The wireless communication terminal may obtain a random number within a range of values that the backoff counter determined according to AC may have. The wireless communication terminal may determine the wait time for each traffic based on the obtained random number. Specifically, the wireless communication terminal defers the transmission of the corresponding traffic by a time obtained by multiplying the obtained random number by a slot time value and adding an arbitrary inter-frame space (AIFS), that is, a fixed time value. The wireless communication terminal reduces the backoff counter value by 1 every time the channel is idle by the slot time. When the backoff counter value becomes 0, the wireless communication terminal transmits the corresponding traffic. At this time, when the backoff counter value of the plurality of traffic corresponds to 0, the wireless communication terminal may transmit the traffic having the highest priority AC among the plurality of traffic. In addition, the wireless communication terminal may again obtain the backoff counter value of the remaining traffic corresponding to the backoff counter value of 0. For this operation, the wireless communication terminal may operate an independent queue for each AC. In a specific embodiment, there may be four ACs. Therefore, there may be four independent queues. In such a manner, the function of managing the queue and the backoff counter value according to the AC is referred to as an Enhanced Distributed Channel Access Function (EDCAF).

In the above-mentioned multi-user transmission, since the wireless communication terminal, which is an AP, indicates the UL transmission time point, a method of determining the traffic transmission order stored in the buffer by the wireless communication terminal considering such operation characteristics is needed. This will be described with reference to FIGS. 28 to 36.

Figure 28:
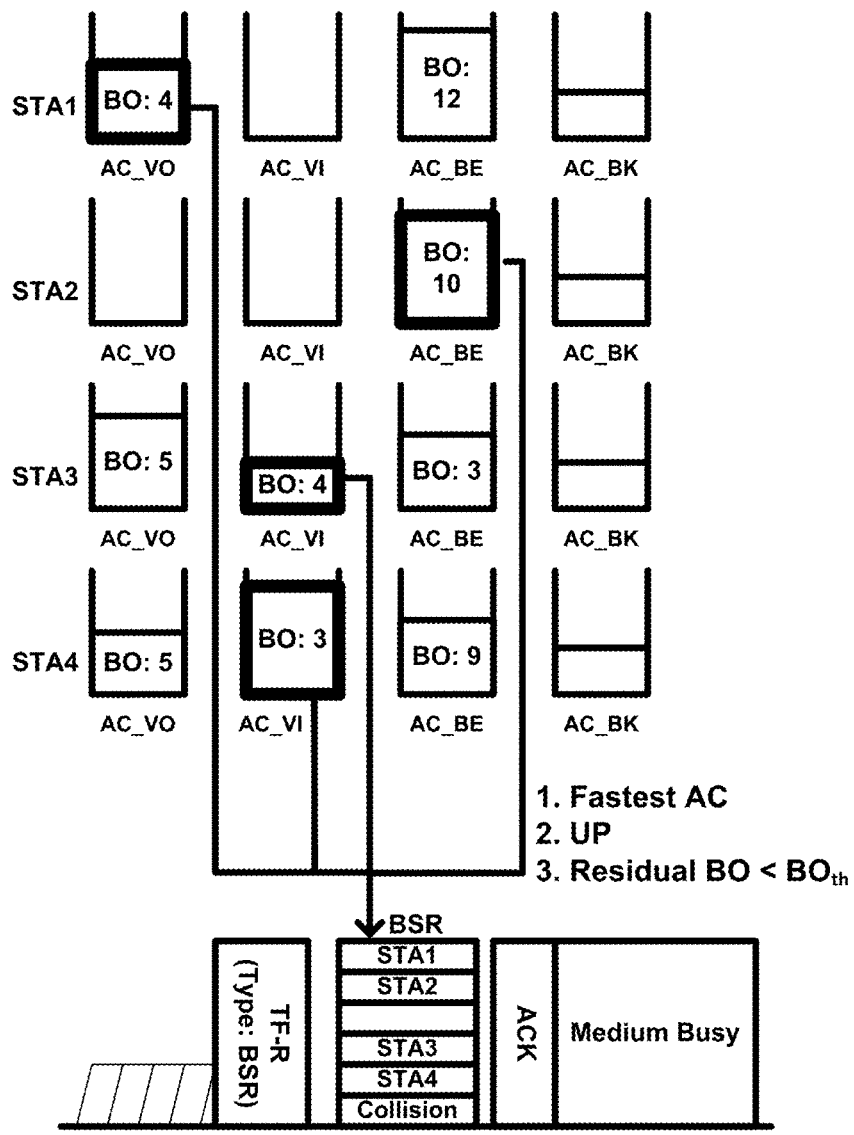
FIGS. 28 to 29 show a method of transmitting a BSR by a wireless communication terminal according to an embodiment of the present invention.

FIG. 28 shows a method of transmitting a BSR by a wireless communication terminal according to an embodiment of the present invention.

The wireless communication terminal may transmit a buffer status report to the wireless communication terminal, which is an AP. The wireless communication terminal, which is an AP, may trigger the UL transmission of the wireless communication terminal based on the received BSR. The wireless communication terminal may transmit information on the traffic in the buffer through the BSR. Specifically, the wireless communication terminal may transmit an identifier for identifying characteristics of traffic in the buffer and a size of traffic through the BSR. At this time, the identifier may be TID or AC. Also, the wireless communication terminal may transmit the back-off counter value of the traffic through the BSR. The wireless communication terminal may transmit information on the traffic corresponding to the condition among the plurality of traffic in the buffer through the BSR.

Specifically, a wireless communication terminal, which is an AP, may transmit a trigger frame that triggers transmission of a BSR through a random access. The non-AP wireless communication terminal may transmit the BSR to the wireless communication terminal, which is an AP, based on the trigger frame. At this time, the non-AP wireless communication terminal may transmit information on the traffic with the smallest remaining waiting time through the BSR. Specifically, the non-AP wireless communication terminal may transmit information on the traffic having the smallest value obtained by multiplying the backoff counter value by the slot time and adding the AIFS through the BSR.

When there are a plurality of traffic having the smallest waiting time, the wireless communication terminal may transmit information on a traffic with high AC among a plurality of traffics through the BSR. In addition, when the waiting time of the traffic is smaller than the reference value, the wireless communication terminal may transmit information on the traffic through the BSR. Specifically, when the backoff counter value is smaller than the reference value, the wireless communication terminal may transmit information on the traffic through the BSR.

In the embodiment of FIG. 28(a), the AP transmits a trigger frame TF-R that triggers the transmission of the BSR through a random access. At this time, the first to fourth stations STA1 to STA4 transmit the BSR to the AP based on the trigger frame. Specifically, the first station STA1 transmits information on traffic corresponding to AC_VO, whose value of the current backoff counter BO is the smallest with 4, through the BSR. In addition, the second station STA2 transmits information on traffic corresponding to AC_BE, whose value of the current backoff counter BO is the smallest with 10, through the BSR. In addition, the third station STA3 transmits information on traffic corresponding to AC_VI, whose value of the current backoff counter BO is the smallest with 4, through the BSR. In addition, the fourth station STA4 transmits information on traffic corresponding to AC_VI, whose value of the current backoff counter BO is the smallest with 3, through the BSR.

At this time, the BSR may be in the format shown in FIG. 28(b). Specifically, the BSR may include the TID or AC of the traffic. In addition, the BSR may include a backoff counter value Residual BO of the traffic as described above. In addition, the BSR may include the length of the traffic.

Figure 29:
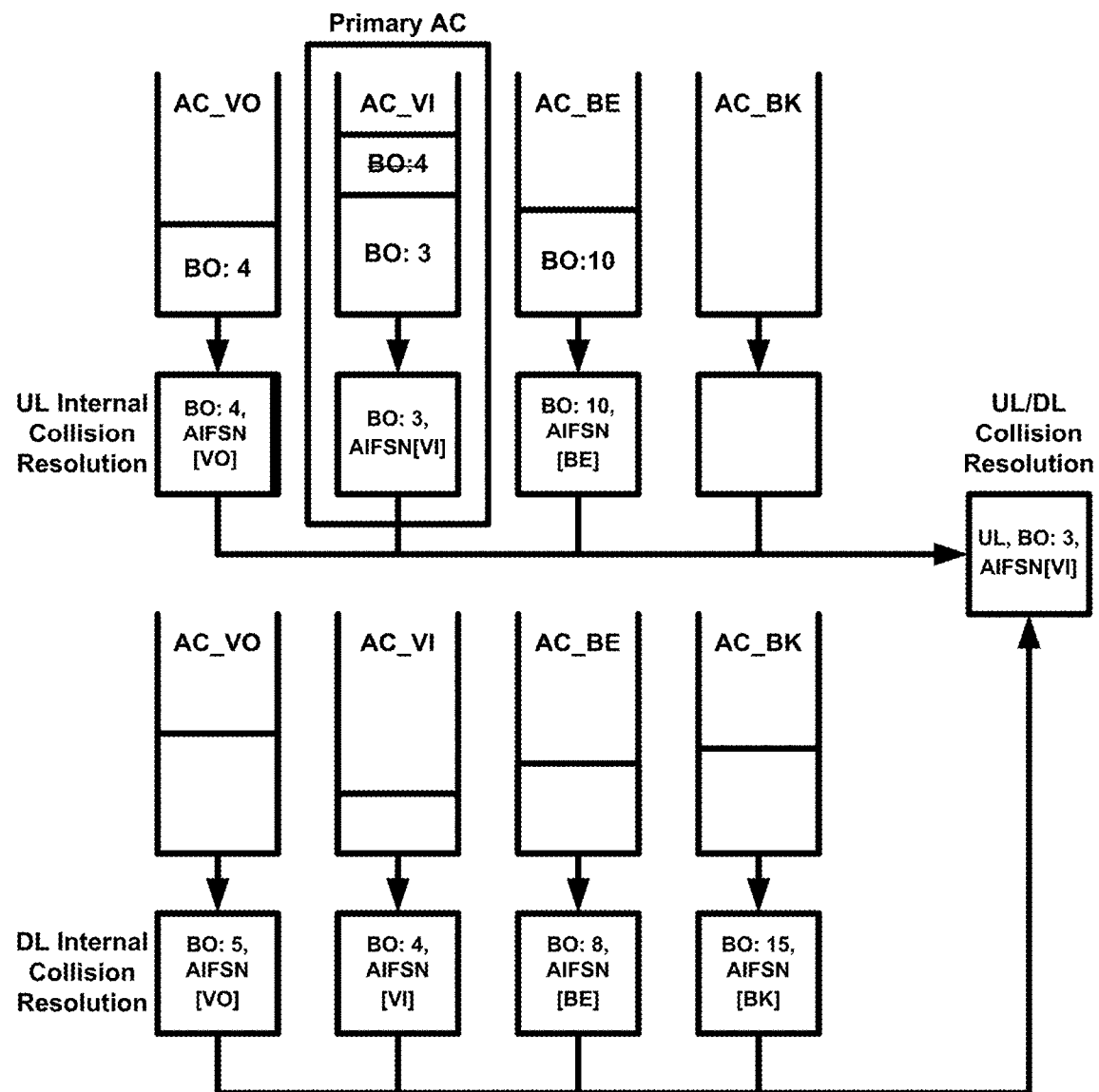

FIG. 29 shows a method of transmitting a BSR by a wireless communication terminal according to an embodiment of the present invention.

A wireless communication terminal, which is an AP, may determine the UL transmission triggering order based on the BSR received from a non-AP wireless communication terminal. Specifically, a wireless communication terminal, which is an AP, may operate an internal queue for determining the UL transmission triggering order. When a wireless communication terminal, which is an AP, receives a BSR, a wireless communication terminal, which is an AP, stores information on traffic in a queue according to a backoff counter value of each traffic. At this time, the wireless communication terminal may store information on the traffic for each AC without distinguishing the wireless communication terminal that transmits the BSR. In addition, when the channel is idle, the wireless communication terminal may reduce the backoff counter value of the information stored in the queue. At this time, if a wireless communication terminal, which is an AP, receives information on traffic having the same AC as the AC of already stored traffic, and the backoff counter value indicated by the received traffic information is smaller than the backoff counter value of the stored traffic, the wireless communication terminal, which is an AP, may set the backoff counter value indicated by the received traffic information to the backoff counter value corresponding to the AC. When the backoff counter value of the traffic information is 0, the wireless communication terminal, which is an AP, may trigger UL transmission for the traffic. When there are a plurality of traffic with a backoff counter value of 0, the wireless communication terminal may determine traffic to trigger the UL transmission through internal collision resolution. Specifically, the wireless communication terminal, which is an AP, may determine the traffic having the high priority AC among the plurality of traffic having the backoff counter value of 0 as traffic to be triggered.

In addition, the wireless communication terminal, which is an AP, may determine the order between UL transmission triggering and DL transmission through a contention between a queue for triggering UL transmission and a queue for DL transmission. Specifically, the wireless communication terminal, which is an AP, may determine the order between UL transmission triggering and DL transmission by comparing AC of traffic corresponding to DL transmission and AC of traffic corresponding to UL transmission triggering. In a specific embodiment, when the AC of the traffic corresponding to the UL transmission triggering is higher than the AC of the traffic corresponding to the DL transmission, the wireless communication terminal, which is an AP, may trigger the UL transmission. In the opposite case, the wireless communication terminal may start DL transmission. When the AC of the traffic corresponding to the DL transmission and the AC of the traffic corresponding to the UL transmission triggering are the same, the wireless communication terminal, which is an AP, may determine the transmission order according to the network characteristic. The wireless communication terminal, which is an AP, stores the DL transmission traffic in the contention between the queue for triggering the UL transmission and the queue for the DL transmission or the UL transmission triggering for the specific traffic in the corresponding queue.

Also, the wireless communication terminal, which is an AP, may determine the UL transmission triggering time based on the received BSR without operating a separate queue or EDCAF for determining the UL transmission triggering order.

In the embodiment of FIG. 29, the wireless communication terminal, which is an AP, operates a queue for UL transmission triggering and a queue for DL transmission. The wireless communication terminal, which is an AP, determines UL transmission triggering of traffic corresponding to AC_VI having the shortest remaining waiting time in the queue for UL transmission. The wireless communication terminal, which is an AP, determines DL transmission of traffic corresponding to AC_VI having the shortest remaining waiting time in the queue for DL transmission. At this time, the wireless communication terminal, which is an AP, may select either one through the UL transmission triggering of traffic corresponding to AC_VI and the contention procedure between the DL transmission of traffic corresponding to AC_VI. Specifically, the wireless communication terminal, which is an AP, may select the UL transmission triggering of traffic corresponding to the AC_VI having a shorter waiting time to trigger UL transmission of traffic corresponding to AC_VI.

Figure 30:
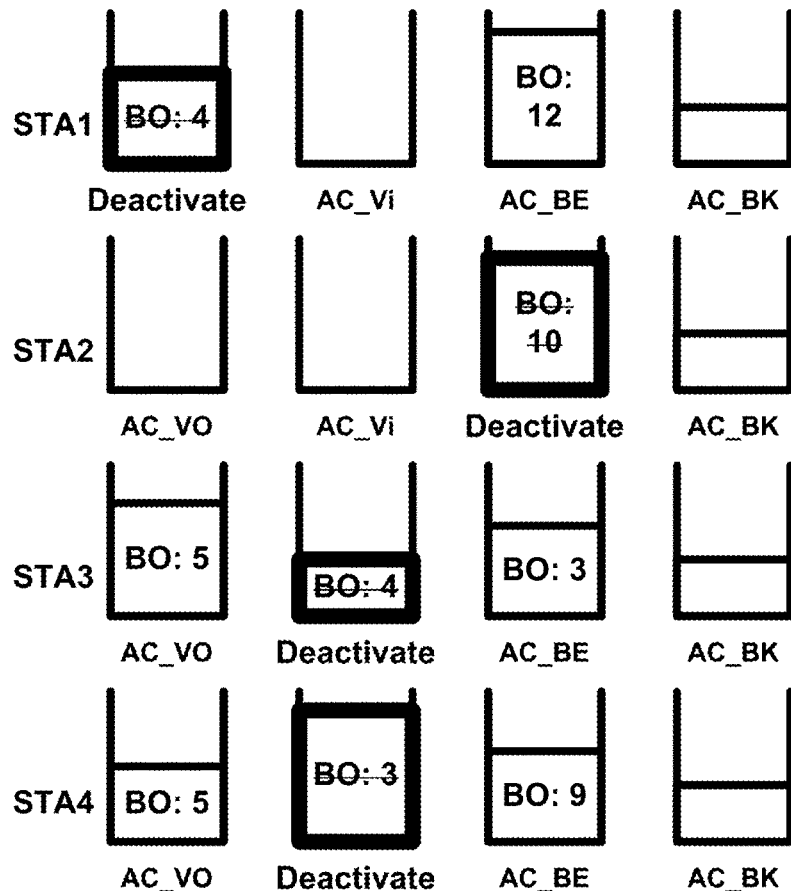
FIGS. 30 to 33 show a method for a wireless communication terminal to operate a queue for BSR transmission according to an embodiment of the present invention.

FIG. 30 shows a method for a wireless communication terminal to operate a queue for BSR transmission according to an embodiment of the present invention.

When the wireless communication terminal receives an ACK for the BSR transmitted by the wireless communication terminal, the wireless communication terminal may stop the EDCAF of the queue storing the traffic reported by the BSR. This is because when the BSR transmission is successful, the time point that the wireless communication terminal that is the AP triggers the UL transmission for the traffic reported by the BSR overlaps the time point that the wireless communication terminal attempts to transmit the traffic. At this time, the wireless communication terminal may not stop the EDCAF for queues other than the queue where the traffic reported by the BSR is stored. Thus, when a UL transmission for the traffic reported to the BSR is triggered, the wireless communication terminal may transmit the traffic reported by the BSR and the traffic not reported by the BSR to the wireless communication terminal, which is an AP. In addition, the wireless communication terminal may transmit the traffic not reported by the SR through the UL SU transmission.

When the wireless communication terminal transmits the traffic reported by the BSR and receives the ACK for the corresponding traffic transmission, the wireless communication terminal may resume the EDCAF of the queue storing the traffic reported by the BSR. At this time, the wireless communication terminal may remove the successfully transmitted traffic from the queue. In addition, when the wireless communication terminal fails to transmit the reported traffic within a predetermined time from the time when the EDCAF is stopped, or fails to receive the ACK for the corresponding traffic transmission, the wireless communication terminal may resume the EDCAF of the queue where the traffic reported by the BSR is stored.

In the embodiment of FIG. 30, the first station STA1 stops the EDCAF of the AC_VO queue storing the traffic that the BSR reports. In addition, the second station STA2 stops the EDCAF of the AC_BE queue storing the traffic reported by the BSR. In addition, the third station STA3 stops the EDCAF of the AC_VI queue storing the traffic reported by the BSR. In addition, the fourth station STA4 stops the EDCAF of the AC_VI queue storing the traffic reported by the BSR.

Figure 31:
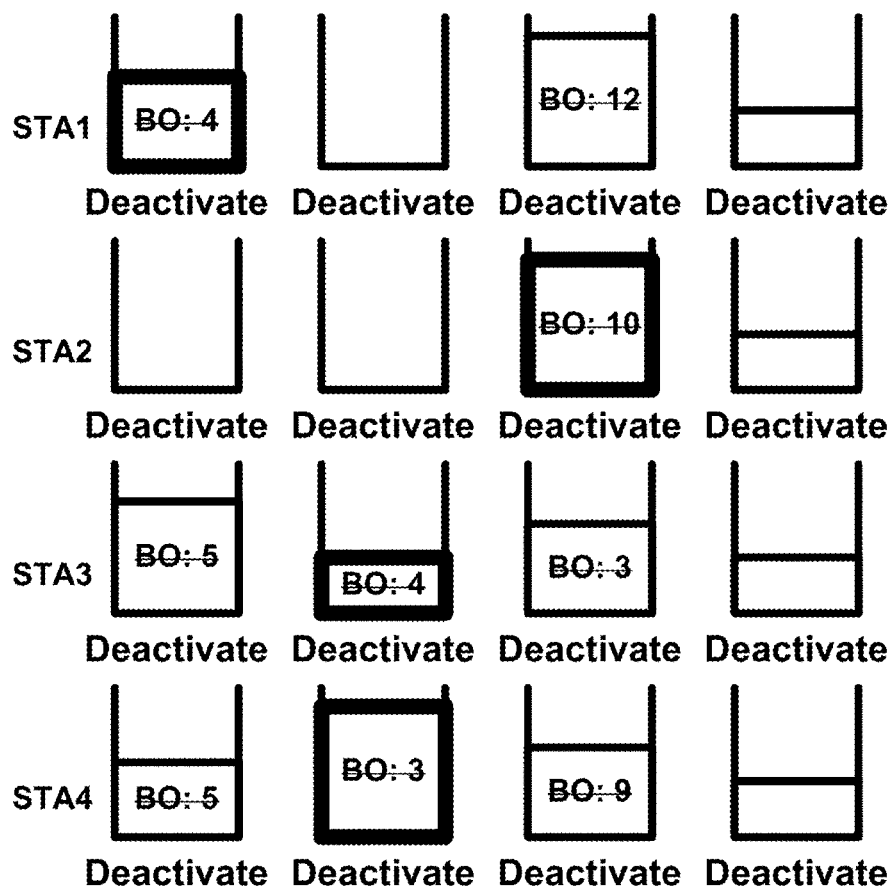

FIG. 31 shows a method for a wireless communication terminal to operate a queue for BSR transmission according to an embodiment of the present invention.

When the wireless communication terminal receives an ACK for the transmitted BSR, the wireless communication terminal may stop the EDCAF of all the queues. This may prevent transmission collisions due to excessive connection attempts. At this time, when the UL transmission of the wireless communication terminal is triggered, the wireless communication terminal may resume the EDCAF of all the queues. In addition, when the wireless communication terminal fails to transmit the reported traffic within a predetermined time from the time when the EDCAF is stopped, or fails to receive the ACK for the corresponding traffic transmission, the wireless communication terminal may resume the EDCAF of all the queues.

In the embodiment of FIG. 31, the first to fourth stations STA1 to STA4 stop the EDCAF of all the queues from the time when the ACK for the BSR is received, unlike the embodiment of FIG. 30.

Figure 32:
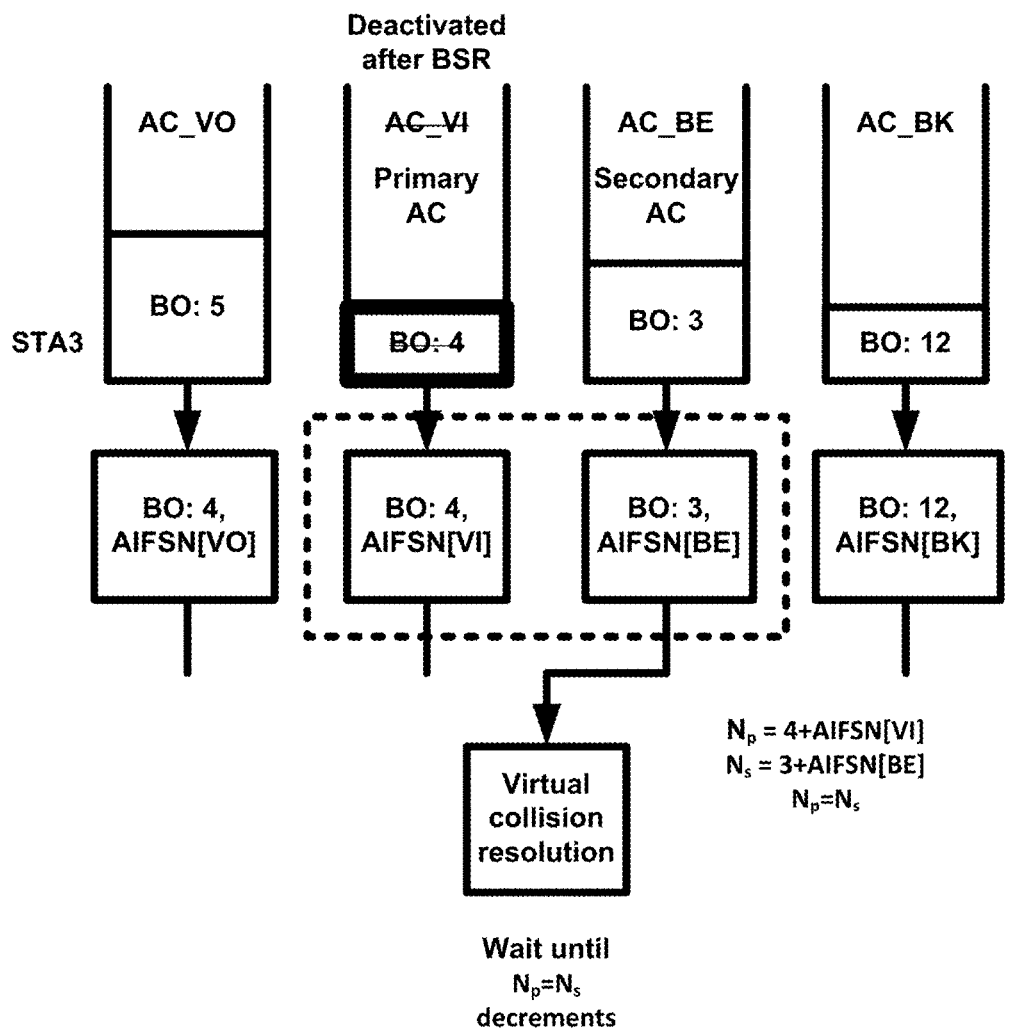

FIG. 32 shows a method for a wireless communication terminal to operate a queue for BSR transmission according to an embodiment of the present invention.

When the wireless communication terminal receives an ACK for the BSR transmitted by the wireless communication terminal and stops the EDCAF of the queue in which the traffic reported by the BSR is stored, if there is a queue in which traffic with the same waiting time as the traffic reported by the BSR is stored, the wireless communication terminal may apply the traffic and internal collision resolution reported by the BSR when transmitting traffic having the same waiting time as the traffic reported by the BSR. This is because there may be collision when the wireless communication terminal may attempt to transmit the traffic with the same waiting time as the traffic reported by the BSR and a communication terminal, which is an AP, triggers UL transmission.

In the embodiment of FIG. 32, the third station STA3 transmits a BSR reporting traffic with a higher priority among traffics with the same latency. Specifically, the waiting times of the AC_VI traffic and the AC_BE traffic are the same. At this time, since the priority of AC_VI is higher than that of AC_BE, the third station STA3 reports traffic corresponding to AC_VI through BSR. Since the waiting times of the AC_VI traffic and the AC_BE traffic are the same, when the traffic whose AC is AC_BE has a backoff counter of 0, the third station STA3 treats as if an internal collision occurred between the traffic in which AC is AC_BE and the traffic in which AC is AC_VI.

Figure 33:
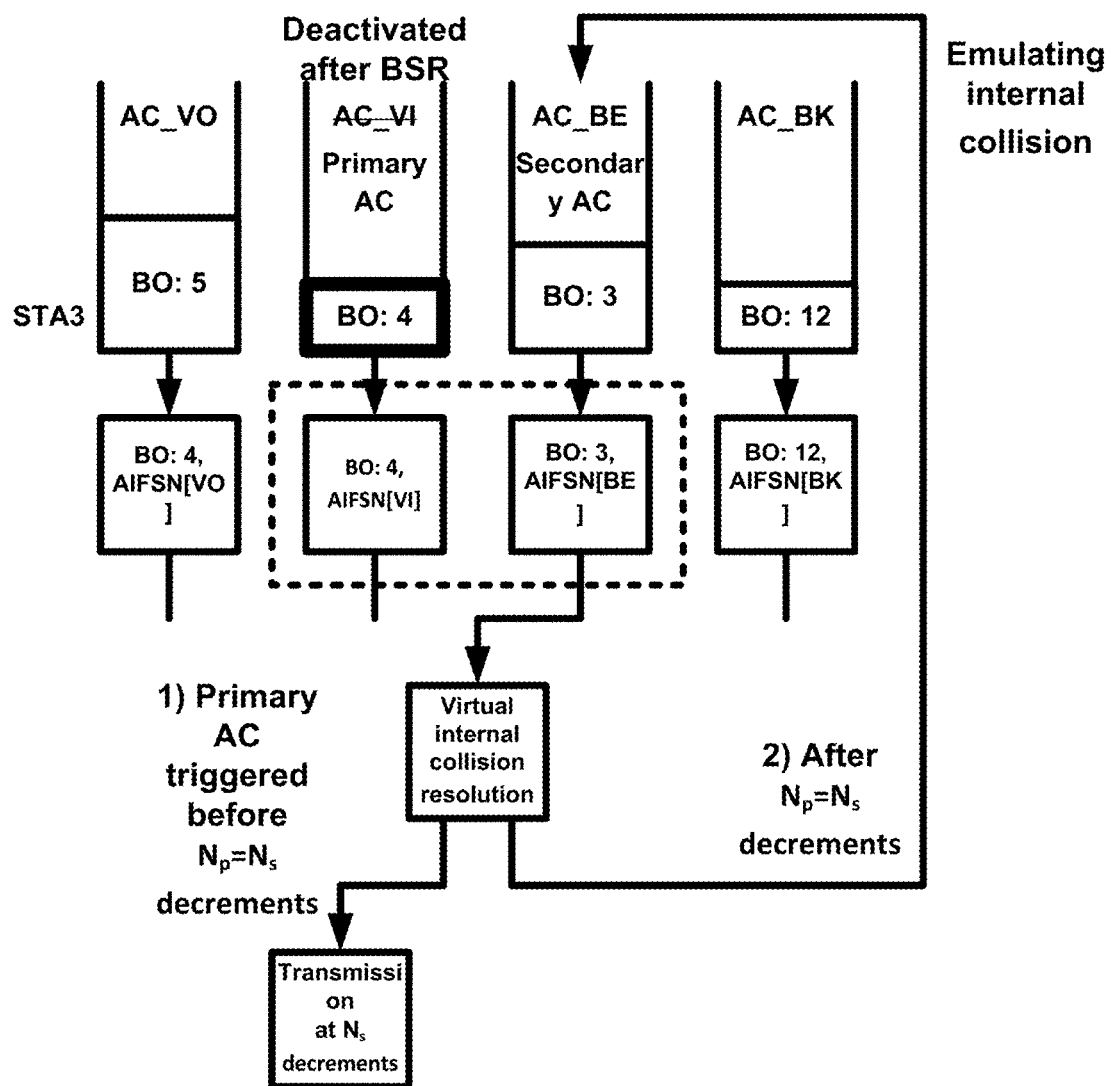

FIG. 33 shows a method for a wireless communication terminal to operate a queue for BSR transmission according to an embodiment of the present invention.

In the embodiment of FIG. 32, since internal collision resolution is applied, the traffic having a waiting time equal to the waiting time of the traffic reported by the BSR acquires a backoff counter and is stored in the queue again. If the trigger frame that triggers the transmission of the traffic reported by the BSR is received earlier than the waiting time of the traffic that the BSR reports, the wireless communication terminal may not apply the internal collision resolution to the traffic having the waiting time equal to the waiting time of the traffic reported by the BSR. Accordingly, the wireless communication terminal may transmit the traffic having the waiting time of the same size as the waiting time of the traffic reported by the BSR, without performing the retransmission preparation procedure such as back-off counter acquisition.

In the embodiment of FIG. 33, the third station STA3 transmits a BSR reporting traffic with a higher priority among traffics with the same latency. Specifically, the waiting times of the AC_VI traffic and the AC_BE traffic are the same. At this time, since the priority of AC_VI is higher than that of AC_BE, the third station STA3 reports traffic corresponding to AC_VI through BSR. Although the waiting times of the AC_VI traffic and the AC_BE traffic are the same, the third station STA3 receives the trigger frame in which the traffic whose AC is AC_BE triggers the traffic whose AC is AC_VI before the backoff counter becomes 0. Therefore, when the traffic whose AC is AC_BE becomes 0, the third station STA3 transmits AC_BE traffic.

Figure 34:
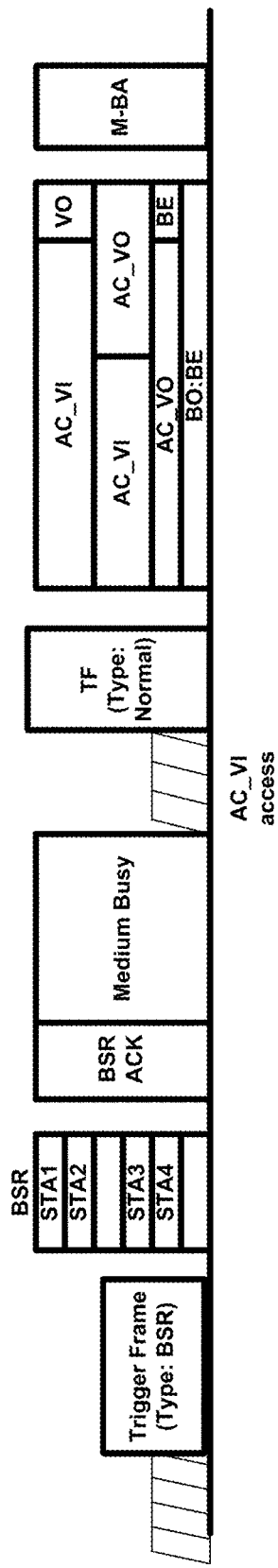
FIG. 34 shows an operation in which a plurality of wireless communication terminals perform simultaneous UL transmission according to an embodiment of the present invention.

FIG. 34 shows operations in which a plurality of wireless communication terminals perform simultaneous UL transmission according to an embodiment of the present invention.

When the UL transmission length signaled by the trigger frame received by the wireless communication terminal is shorter than the time required for the traffic transmission corresponding to the AC triggered by the trigger frame, the wireless communication terminal may transmit both the traffic triggered by the trigger frame and the traffic with the highest priority next to the AC triggered by the trigger frame.

In the embodiment of FIG. 34, the AP transmits a trigger frame for triggering the BSR transmission to the first station STA1 to the fourth station STA4. The AP receives the BSR and transmits an ACK for the BSR from the first station STA1 to the fourth station STA4.

The AP transmits a trigger frame for triggering the UL transmission of the first to fourth stations STA1 to STA4. In particular, the AP triggers the first station STA1 to transmit traffic whose AC is AC_VI. The first station STA1 confirms that the time required to transmit traffic corresponding to the AC_VI stored in the first station STA1 buffer is shorter than the transmission length triggered by the trigger frame. Therefore, the first station STA1 transmits traffic corresponding to AC_VI and transmits traffic corresponding to AC_VO.

When the wireless communication terminal, which is an AP, triggers a uplink transmission of a traffic having a size smaller than the size of the traffic reported through the BSR, the wireless communication terminal, which is an AP, may reuse the backoff counter value used in determining the transmission order of remaining traffics that are not triggered. In this case, when internal collision resolution is applied to the uplink transmission of the traffic having a size smaller than the reported traffic size, the wireless communication terminal may use a new backoff counter value when determining the transmission order of remaining traffics that are not triggered.

Figure 35:
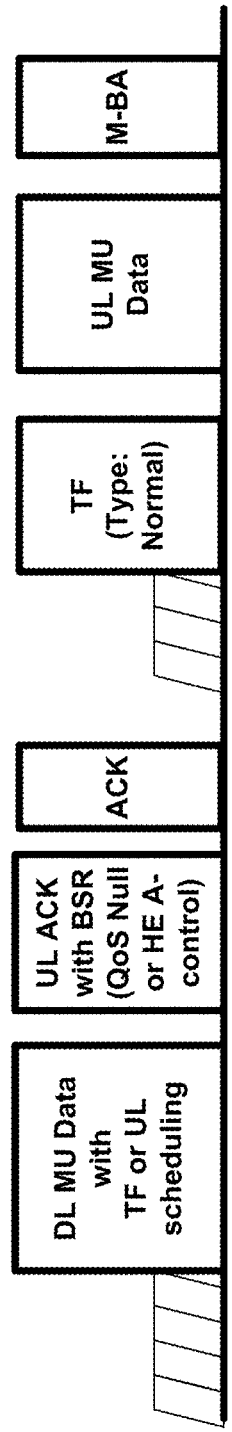
FIGS. 35 to 36 show an operation in which a wireless communication terminal transmits a BSR according to an embodiment of the present invention.

FIG. 35 shows an operation in which a wireless communication terminal transmits a BSR according to an embodiment of the present invention.

When a wireless communication terminal, which is an AP, transmits DL data, the wireless communication terminal, which is an AP, may transmit the trigger frame together with the DL data or the UL scheduling transmission of the MAC header to trigger the BSR transmission of the wireless communication terminal that receive the DL data.

At this time, when the wireless communication terminal transmits the ACK to the wireless communication terminal, which is an AP, it may transmit the BSR together with the ACK. Specifically, when the wireless communication terminal transmits the ACK to a wireless communication terminal, which is an AP, the wireless communication terminal may transmit the BSR together with the ACK through the MAC header. In a specific embodiment, when the wireless communication terminal transmits the ACK to a wireless communication terminal, which is an AP, the wireless communication terminal may transmit the BSR together with the ACK through the HE-A control field of the MAC header. In addition, the wireless communication terminal may transmit the BSR through the QoS NULL MPDU.

In the embodiment of FIG. 35, the AP transmits DL data to the station. At this time, the AP transmits the trigger frame together with the DL data or transmits the UL scheduling of the MAC header. The station transmits an ACK for the DL data to the AP. At this time, the station may transmit the BSR through the HE-A control field of the MAC header or the BSR through the QoS NULL MPDU. The AP schedules UL transmissions based on the BSR received from the station. The AP then triggers the UL transmission of the station through the trigger frame according to the UL transmission scheduling.

Figure 36:
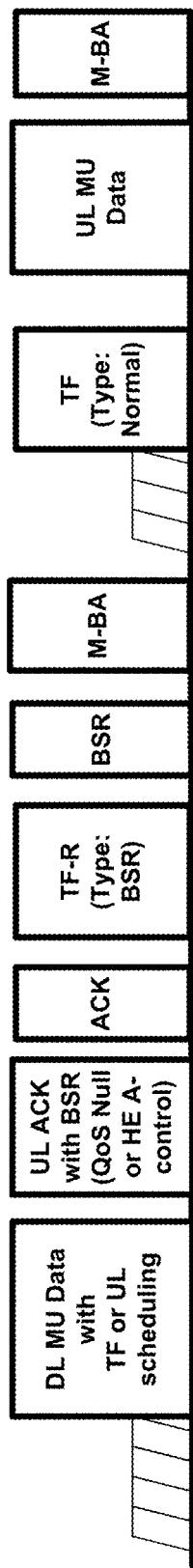

FIG. 36 shows an operation in which a wireless communication terminal transmits a BSR according to an embodiment of the present invention.

The wireless communication terminal, which is an AP, may trigger the BSR transmission with DL data transmission to receive the BSR as described with reference to FIG. 35. At this time, since the wireless communication terminal, which is an AP, receives the BSR together with the ACK, the wireless communication terminal may not sufficiently receive the traffic information in the buffer of the wireless communication terminal, which is an AP. If the wireless communication terminal, which is an AP, does not sufficiently receive the traffic information in the buffer, the wireless communication terminal, which is an AP, may transmit the trigger frame for triggering the BSR transmission through the random access.

In the embodiment of FIG. 36, the AP transmits DL data to the station. At this time, the AP transmits the trigger frame together with the DL data or transmits the UL scheduling of the MAC header. The station transmits an ACK for the DL data to the AP. At this time, the station may transmit the BSR through the HE-A control field of the MAC header or the BSR through the QoS NULL MPDU. The AP then transmits a trigger frame to the station to trigger the BSR transmission through a random access. The AP receives BSRs from a plurality of stations and schedules UL transmissions based on the BSRs. The AP then triggers the UL transmission of a plurality of stations through the trigger frame according to the UL transmission scheduling.

Figure 37:
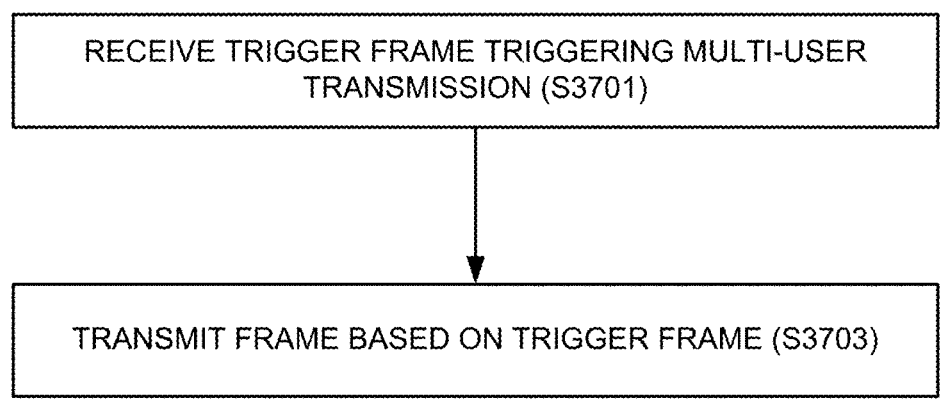
FIG. 37 shows the operation of a wireless communication terminal according to an embodiment of the present invention.

FIG. 37 shows the operation of a wireless communication terminal according to an embodiment of the present invention.

The wireless communication terminal receives a trigger frame for triggering multi-user transmission (S3701). The wireless communication terminal may receive a trigger frame for triggering multi-user transmission from a wireless communication terminal, which is an AP.

The wireless communication terminal transmits the frame based on the trigger frame (S3703).

At this time, the trigger frame may be a frame for triggering the transmission of a frame for setting a link with the wireless communication terminal, which is an AP, described with reference to FIG. 6 to FIG. 15. Specifically, the wireless communication terminal may receive the trigger frame that triggers that the frame for setting a link with the wireless communication terminal, which is an AP, is transmitted through transmission of an UpLink Multi User (UL MU). At this time, the wireless communication terminal may be a wireless communication terminal unassociated with the wireless communication terminal, which is an AP, as described above. Further, a wireless communication terminal may be a wireless communication terminal that is not authenticated by the wireless communication terminal, which is an AP. Further, the wireless communication terminal may transmit the frame for a link setup based on a trigger frame. Specifically, the wireless communication terminal may transmit the frame for a link setup based on the trigger frame through a UL MU transmission. At this time, the frame for a link setup may be an authentication request frame. In addition, the frame for a link setup may be an association request frame. In addition, the trigger frame may be triggered to transmit the frame for setting a link with the wireless communication terminal, which is an AP, through a random access, as described above.

In addition, the wireless communication terminal may determine whether the trigger frame triggers transmission of the frame for a link setup based on an association identifier (AID) signaled by the trigger frame. At this time, the AID may indicate the wireless communication terminal to perform UL transmission based on the trigger frame. In addition, the AID may indicate a wireless communication terminal to perform UL transmission for each RU. Specifically, the wireless communication terminal may determine whether the trigger frame triggers transmission of the frame for a link setup based on whether the AID indicating the wireless communication terminal triggered by the trigger frame is a predetermined value. In this case, the predetermined value may be a value distinguishable from the AID assigned to the wireless communication terminal after association by the wireless communication terminal, which is an AP. Specifically, the predetermined value may correspond to any number out of the range of the AID value that may be assigned to the wireless communication terminal after the association. In a specific embodiment, the predetermined value may be one of the reserved values of the AID assigned to the wireless communication terminal after association. For example, the predetermined value may be any number after 2007.

Trigger frames may trigger the transmission of frames for a link setup and frames irrelevant to the link setup. Specifically, the trigger frame triggers that the frame for a link setup is UL transmitted through the first RU and a frame not related to the link setup may be UL transmitted through the second RU. At this time, the frame irrelevant to the link setup may be at least one of a data frame, a control frame, and a management frame.

The trigger frame may include association delay information indicating the minimum time required for the association procedure to start. The wireless communication terminal may determine whether to participate in the association procedure based on the association delay information. Specifically, the AP wireless communication terminal may determine whether to transmit the association request frame based on the trigger frame that triggers the transmission of the association request frame based on the association delay information. In a specific embodiment, if the delay time indicated by the association delay information is smaller than a predetermined reference value, the wireless communication terminal may transmit the association request frame to the wireless communication terminal, which is an AP, based on the trigger frame to be transmitted after the trigger frame including the association delay information.

The wireless communication terminal may receive the number of times that the trigger frame that triggers the transmission of the frame for a link setup is scheduled. Specifically, the wireless communication terminal may receive the number of times that the trigger frame for triggering the transmission of the frame for a link setup is scheduled based on a beacon. At this time, the trigger frame may indicate the number of scheduled times within a specified period. Specifically, the specified period may be the transmission period of the beacon. The wireless communication terminal may obtain an OBO counter for random access based on the number of times that the trigger frame that triggers the link setup is scheduled. Specifically, the wireless communication terminal may increase the range of the OBO counter based on the number of times that the trigger frame is scheduled.

Specifically, a wireless communication terminal, which is an AP, may transmit a response frame for a link setup through DL MU transmission. Accordingly, the wireless communication terminal may receive a response frame for a link setup from the wireless communication terminal, which is an AP, through DL MU transmission. Specifically, a wireless communication terminal, which is an AP, may insert a temporary AID used for triggering a frame for a link setup in the trigger frame in a signaling field of a PPDU for DL MU transmission. In addition, the wireless communication terminal receives a response frame for the frame for a link setup based on whether the signaling field of the PPDU for DL MU transmission includes a temporary AID used to trigger UL transmission of the frame for a link setup. At this time, the signaling field of the PPDU may be a field indicating a wireless communication terminal to receive the PPDU. In addition, the temporary AID may be a value distinguishable from the AID assigned to the wireless communication terminal after association by the wireless communication terminal, which is an AP. Also, the value of the temporary AID may be out of the range of the AID value that may be assigned to a wireless communication terminal associated with the wireless communication terminal, which is an AP, after the association as described above.

In addition, the trigger frame may be the MU-RTS frame described above. In addition, the frame transmitted based on the trigger frame may be a simultaneous CTS frame. Accordingly, the wireless communication terminal may operate in the same manner as the embodiments described with reference to FIGS. 16 to 19. Specifically, the wireless communication terminal may transmit a simultaneous CTS frame as described with reference to FIG. 16 to FIG. 19. Also, the wireless communication terminal, which is an AP, may set the parameters of the trigger frame as in the embodiments described with reference to FIG. 20 to FIG. 27. Also, the wireless communication terminal may set a trigger-based PPDU as in the embodiments described with FIG. 20 to FIG. 27.

In addition, the wireless communication terminal, which is an AP, may determine the order of traffic to trigger UL transmission as in the embodiments described with reference to FIG. 28 to FIG. 36. Specifically, the wireless communication terminal, which is an AP, may determine the order of the traffic to trigger the UL transmission based on the BSR received by the wireless communication terminal, which is an AP. In addition, the wireless communication terminal may transmit the BSR as in the embodiments described with reference to FIG. 28 to FIG. 36.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal communicating wirelessly, the terminal comprising:
a transceiver configured to receive and transmit a wireless signal; and
a processor,
wherein the processor is configured to:
receive, through the transceiver, a first trigger frame from a base wireless communication terminal, wherein the first trigger frame triggers a transmissions of the wireless communication terminal and indicates a resource unit which is allocated to the wireless communication terminal,
transmit, through the transceiver, a first response frame in response to the first trigger frame to the base wireless communication terminal using the resource unit indicated in the first trigger frame, and
stop enhanced distributed channel access function (EDCAF) corresponding to the first response frame when the wireless communication terminal receives an ACK for the first response frame, wherein the EDCAF is a function for determining a time at which a frame in a queue is transmitted and is defined per access category.

2. The wireless communication terminal of claim 1, wherein the processor is configured to:
receive, through the transceiver, a second trigger frame from the base wireless communication terminal, wherein the second trigger frame triggers a transmissions of the wireless communication terminal and indicates a resource unit which is allocated to the wireless communication terminal,
transmit, through the transceiver, a second response frame in response to the second trigger frame to the base wireless communication terminal using the resource unit indicated in the second trigger frame, and
restart the EDCAF corresponding to the second response frame when the wireless communication terminal receives an ACK for the second response frame.

3. The wireless communication terminal of claim 1, wherein the processor is configured to restart the EDCAF corresponding to the first response frame when a predetermined time elapses from time at which the wireless communication terminal receives the ACK for the first response frame.

4. The wireless communication terminal of claim 3, wherein the processor is configured to restart every EDCAF.

5. The wireless communication terminal of claim 1, wherein the first response frame includes a buffer status report (BSR).

6. The wireless communication terminal of claim 5, wherein the processor is configured to stop EDCAF which corresponds to traffic reported by the BSR.

7. The wireless communication terminal of claim 5, wherein the first trigger frame triggers random access,
wherein the processor is configured to transmit, through the transceiver, the first response frame using random access.

8. The wireless communication terminal of claim 5, wherein the processor is configured to transmit, through the transceiver, the BSR through an HE-A control field of a MAC header or a QoS NULL MPDU.

9. An operation method of wireless communication terminal communicating wirelessly, the method comprising:
receiving a first trigger frame from a base wireless communication terminal, wherein the first trigger frame triggers a transmissions of the wireless communication terminal and indicates a resource unit which is allocated to the wireless communication terminal;
transmitting a first response frame in response to the first trigger frame to the base wireless communication terminal; and
stopping enhanced distributed channel access function (EDCAF) corresponding to the first response frame when the wireless communication terminal receives an ACK for the first response frame, wherein the EDCAF is a function for determining a time at which a frame in a queue is transmitted and is defined per access category.

10. The operation method of claim 9, the method further comprises receiving a second trigger frame from the base wireless communication terminal, wherein the second trigger frame triggers a transmissions of the wireless communication terminal and indicates a resource unit which is allocated to the wireless communication terminal;

transmitting a second response frame in response to the second trigger frame to the base wireless communication terminal; and restarting EDCAF corresponding to the first response frame when the wireless communication terminal receives an ACK for the second response frame.

11. The operation method of claim 9, the method further comprises restarting the EDCAF corresponding to the second response frame when a predetermined time elapses from time at which the wireless communication terminal receives the ACK for the first response frame.

12. The operation method of claim 11, wherein the restarting EDCAF comprises restarting every EDCAF.

13. The operation method of claim 9, wherein the first response frame includes a buffer status report (BSR).

14. The operation method of claim 13, wherein the stopping EDCAF comprises stopping EDCAF which corresponds to traffic reported by the BSR.

15. The operation method of claim 13, wherein the first trigger frame triggers random access, wherein transmitting the first response frame in response to the first trigger frame comprises transmitting the first response frame comprises transmitting the first response frame using random access.

16. The operation method of claim 13, wherein transmitting the first response frame comprises transmitting the BSR through an HE-A control field of a MAC header or a QoS NULL MPDU.

* * * * *